US008417483B2

(12) United States Patent
Anderson et al.

(10) Patent No.: US 8,417,483 B2
(45) Date of Patent: *Apr. 9, 2013

(54) DETERMINATION AND CONTROL OF WELLBORE FLUID LEVEL, OUTPUT FLOW, AND DESIRED PUMP OPERATING SPEED, USING A CONTROL SYSTEM FOR A CENTRIFUGAL PUMP DISPOSED WITHIN THE WELLBORE

(75) Inventors: Robb G. Anderson, Eden Prairie, MN (US); Thomas L. Beck, Union Grove, WI (US)

(73) Assignee: Unico, Inc., Franksville, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,778

(22) Filed: Jul. 17, 2012

(65) Prior Publication Data

US 2012/0283950 A1 Nov. 8, 2012

Related U.S. Application Data

(60) Division of application No. 13/445,046, filed on Apr. 12, 2012, now Pat. No. 8,249,826, which is a division of application No. 12/987,706, filed on Jan. 10, 2011, now Pat. No. 8,180,593, which is a division of application No. 12/707,713, filed on Feb. 18, 2010, now Pat. No. 7,869,978, which is a division of application No. 11/741,412, filed on Apr. 27, 2007, now Pat. No. 7,668,694, which is a continuation-in-part of application No. 11/502,677, filed on Aug. 10, 2006, now Pat. No. 7,558,699, which is a division of application No. 10/656,091, filed on Sep. 5, 2003, now Pat. No. 7,117, 120.

(60) Provisional application No. 60/429,158, filed on Nov. 26, 2002, provisional application No. 60/414,197, filed on Sep. 27, 2002.

(51) Int. Cl.
*G06F 11/30* (2006.01)
*G05D 9/00* (2006.01)
*G01F 23/00* (2006.01)

(52) U.S. Cl. ............ 702/182; 700/281; 73/290 R
(58) Field of Classification Search .......... 702/182, 702/1–2, 6, 9, 11–13, 33, 41, 45, 50, 55, 702/127, 138, 140, 142, 145–147, 156, 179, 702/183; 700/275, 281–282; 417/20, 22, 417/42–43, 44.2; 210/97, 100, 130; 415/13, 415/16–17, 25, 89; 73/152.18–152.22, 152.29, 73/152.34, 152.46, 152.51, 152.61, 195–196, 73/861, 861.69, 290 R, 302

See application file for complete search history.

(56) References Cited

U.S. PATENT DOCUMENTS

| | | |
|---|---|---|
| 3,343,409 A | 9/1967 | Gibbs |
| 3,393,642 A | 7/1968 | Kordik |

(Continued)

OTHER PUBLICATIONS

Irvine et al., The Use of Variable Frequency Drives as a Final Control Element in the Petroleum Industry, 2000 IEEE, pp. 2749-2758.

(Continued)

*Primary Examiner* — Toan Le
(74) *Attorney, Agent, or Firm* — Reinhart Boerner Van Deuren s.c.

(57) ABSTRACT

A method and apparatus for determining a fluid level and/or output flow during operation of a centrifugal pump, are provided, which may be used for production of gas and/or oil from a well, and include a vector feedback model to derive values of torque and speed from signals indicative of instantaneous current and voltage drawn by the pump motor, a pump model which derives values of the fluid flow rate and the head pressure for the pump from torque and speed inputs, a pumping system model that derives, from the estimated values of the pump operating parameters, an estimated value of fluid level and other pumping system parameters. Controllers responsive to the estimated values of the pumping system parameters control the pump to maintain fluid level at the pump input, near an optimum level, or within a safe operating range and/or output flow from the pump.

5 Claims, 23 Drawing Sheets

U.S. PATENT DOCUMENTS

| | | | |
|---|---|---|---|
| 3,585,484 | A | 6/1971 | Dortort |
| 3,646,808 | A | 3/1972 | Leonard |
| 3,851,995 | A | 12/1974 | Mills |
| 3,854,846 | A | 12/1974 | Douglas |
| 3,915,225 | A | 10/1975 | Swink |
| 3,918,843 | A | 11/1975 | Douglas et al. |
| 3,930,752 | A | 1/1976 | Douglas |
| 3,936,231 | A | 2/1976 | Douglas |
| 3,938,910 | A | 2/1976 | Douglas |
| 3,951,209 | A | 4/1976 | Gibbs |
| 3,963,374 | A | 6/1976 | Sullivan |
| 3,965,983 | A | 6/1976 | Watson |
| 3,998,568 | A | 12/1976 | Hynd |
| 4,058,757 | A | 11/1977 | Welton et al. |
| 4,102,394 | A | 7/1978 | Botts |
| 4,108,574 | A | 8/1978 | Bartley et al. |
| 4,118,148 | A | 10/1978 | Allen |
| 4,145,161 | A | 3/1979 | Skinner |
| 4,171,185 | A | 10/1979 | Duke et al. |
| 4,194,393 | A | 3/1980 | Boley |
| 4,220,440 | A | 9/1980 | Taylor et al. |
| 4,286,925 | A | 9/1981 | Standish |
| 4,363,605 | A | 12/1982 | Mills |
| 4,370,098 | A | 1/1983 | McClain et al. |
| 4,390,321 | A | 6/1983 | Langlois et al. |
| 4,406,122 | A | 9/1983 | McDuffie |
| 4,438,628 | A | 3/1984 | Creamer |
| 4,474,002 | A | 10/1984 | Perry |
| 4,476,418 | A | 10/1984 | Werner |
| 4,480,960 | A | 11/1984 | Streib |
| 4,483,188 | A | 11/1984 | McTamaney et al. |
| 4,487,061 | A | 12/1984 | McTamaney et al. |
| 4,490,094 | A | 12/1984 | Gibbs |
| 4,507,055 | A | 3/1985 | Fair et al. |
| 4,508,487 | A | 4/1985 | Taylor et al. |
| 4,508,488 | A | 4/1985 | Pikna |
| 4,509,901 | A | 4/1985 | McTamaney et al. |
| 4,534,168 | A | 8/1985 | Brantly |
| 4,534,706 | A | 8/1985 | Palm et al. |
| 4,541,274 | A | 9/1985 | Purcupile |
| 4,583,915 | A | 4/1986 | Montgomery et al. |
| 4,594,665 | A | 6/1986 | Chandra et al. |
| 4,631,954 | A | 12/1986 | Mills |
| 4,661,751 | A | 4/1987 | Werner |
| 4,678,404 | A | 7/1987 | Lorett et al. |
| 4,681,167 | A | 7/1987 | Soderberg |
| 4,695,779 | A | 9/1987 | Yates |
| 4,741,397 | A | 5/1988 | Weeks |
| 4,747,451 | A | 5/1988 | Adams, Jr. et al. |
| 4,830,112 | A | 5/1989 | Erickson |
| 4,859,151 | A | 8/1989 | Reed |
| 4,873,635 | A | 10/1989 | Mills |
| 4,935,685 | A | 6/1990 | Justus et al. |
| 4,971,522 | A | 11/1990 | Butlin |
| 4,973,226 | A | 11/1990 | McKee |
| 5,006,044 | A | 4/1991 | Walker, Sr. et al. |
| 5,044,888 | A | 9/1991 | Hester, II |
| 5,063,775 | A | 11/1991 | Walker, Sr. et al. |
| 5,064,349 | A | 11/1991 | Turner et al. |
| 5,129,264 | A | 7/1992 | Lorenc |
| 5,129,267 | A | 7/1992 | Nicholls |
| 5,167,490 | A | 12/1992 | McKee et al. |
| 5,180,289 | A | 1/1993 | Wenholz et al. |
| 5,204,595 | A | 4/1993 | Opal et al. |
| 5,222,867 | A | 6/1993 | Walker, Sr. et al. |
| 5,224,834 | A | 7/1993 | Westerman et al. |
| 5,230,607 | A | 7/1993 | Mann |
| 5,237,863 | A | 8/1993 | Dunham |
| 5,240,380 | A | 8/1993 | Mabe |
| 5,246,076 | A | 9/1993 | Watson |
| 5,251,696 | A | 10/1993 | Boone et al. |
| 5,252,031 | A | 10/1993 | Gibbs |
| 5,281,100 | A | 1/1994 | Diederich |
| 5,284,422 | A | 2/1994 | Turner et al. |
| 5,316,085 | A | 5/1994 | Dawson |
| 5,318,409 | A | 6/1994 | London et al. |
| 5,362,206 | A | 11/1994 | Westerman et al. |
| 5,372,482 | A | 12/1994 | London et al. |
| 5,425,623 | A | 6/1995 | London et al. |
| 5,441,389 | A | 8/1995 | Wolcott et al. |
| 5,444,609 | A | 8/1995 | Swamy et al. |
| 5,458,466 | A | 10/1995 | Mills |
| 5,634,522 | A | 6/1997 | Hershberger |
| 5,819,849 | A | 10/1998 | Booth |
| 5,823,262 | A | 10/1998 | Dutton |
| 5,829,530 | A | 11/1998 | Nolen |
| 5,868,029 | A | 2/1999 | Paine |
| 5,941,305 | A | 8/1999 | Thrasher et al. |
| 5,996,691 | A | 12/1999 | Norris et al. |
| 6,041,856 | A | 3/2000 | Thrasher et al. |
| 6,043,569 | A | 3/2000 | Ferguson |
| 6,045,333 | A | 4/2000 | Breit |
| 6,079,491 | A | 6/2000 | Stuebinger et al. |
| 6,092,600 | A | 7/2000 | McKinzie et al. |
| 6,127,743 | A | 10/2000 | Levin et al. |
| 6,129,110 | A | 10/2000 | Kolb |
| 6,155,347 | A | 12/2000 | Mills |
| 6,176,682 | B1 | 1/2001 | Mills |
| 6,464,464 | B2 | 10/2002 | Sabini et al. |
| 6,536,522 | B2 | 3/2003 | Birckhead et al. |
| 6,585,041 | B2 | 7/2003 | Crossley |
| 6,592,340 | B1 | 7/2003 | Horo et al. |
| 6,615,926 | B2 | 9/2003 | Hester et al. |
| 6,837,313 | B2 | 1/2005 | Hosie et al. |
| 6,866,625 | B1 | 3/2005 | Ayre et al. |
| 6,879,129 | B2 | 4/2005 | Tazawa et al. |
| 6,904,982 | B2 | 6/2005 | Judge et al. |
| 6,918,307 | B2 | 7/2005 | Ohlsson et al. |
| 7,010,393 | B2 | 3/2006 | Mirsky et al. |
| 7,025,571 | B2 | 4/2006 | Jeun |
| 7,117,120 | B2 | 10/2006 | Beck et al. |
| 7,168,924 | B2 | 1/2007 | Beck et al. |
| 7,558,699 | B2 | 7/2009 | Beck et al. |
| 7,668,694 | B2 | 2/2010 | Anderson et al. |
| 7,869,978 | B2 | 1/2011 | Anderson et al. |
| 2004/0062658 | A1 | 4/2004 | Beck et al. |
| 2004/0064292 | A1* | 4/2004 | Beck et al. ............ 702/182 |

OTHER PUBLICATIONS

Gibbs, S.C.: "Predicting the Behavior of Sucker-Rod Pumping Systems", JPT (Jul. 1963, 769-78, Trans, AIME 228); pp. 769-778 (10 pages).

Garlow, M.E.: "Sensorless Estimation of a Sucker-Rod Pump Downhole Dynacard", Unico, Inc., Aug. 12, 2002; pp. 1-9.

Everitt, T.A., and Jennings, J.W.: "An Improved Finite-Difference Calculation of Downhole Dynamometer Cards for Sucker-Rod Pumps", Paper SPE 18189, SPE Production Engineering (Feb. 1992); 12 pages.

Jansen, P.L. and Lorenz, R.D.: "Accuracy Limitations of Velocity and Flux Estimation in Direct Field Oriented Induction Machines", Power Electronics and Applications, 1993, Fifth European Conference; pp. 312-318, vol. 4 (7 pages).

Lorenz, R.D. and Lawson, D.B.: "A Simplified Approach to Continuous On-Line Tuning of Field-Oriented Induction Machine Drives", IEEE Transactions on Industry Applications, vol. 26, No. 3, May/Jun. 1990; pp. 420-422 (3 pages).

Hasan, A.R. and Kabir, C.S.: "Fluid Flow and Heat Transfer in Wellbores", Society of Petroleum Engineers, Richardson, TX, 2002; pp. 7-36 (31 pages).

Sergio, C., Escalante, S., Pessoa, R., Henry, J.; "ESP Lab Test With Heavy Oil At INTEVEP's Artificial Lift Simulator Facility", Society of Petroleum Engineers Inc. 1997; 17 pages.

Fay, James A., Introduction to Fluid Mechanics, book, Cambridge, Massachusetts, MIT Press, 1994, 4 pages.

U.S. Appl. No. 60/414,197, filed Sep. 27, 2002, Thomas L. Beck.

U.S. Appl. No. 60/429,158, filed Nov. 26, 2002, Robb G. Anderson.

An et al., Effects of Density and Viscosity in Vertical Zero Net Liquid Flow, Jun. 2000, Journal of Energy Resources Technology, vol. 122, pp. 49-55.

* cited by examiner

150

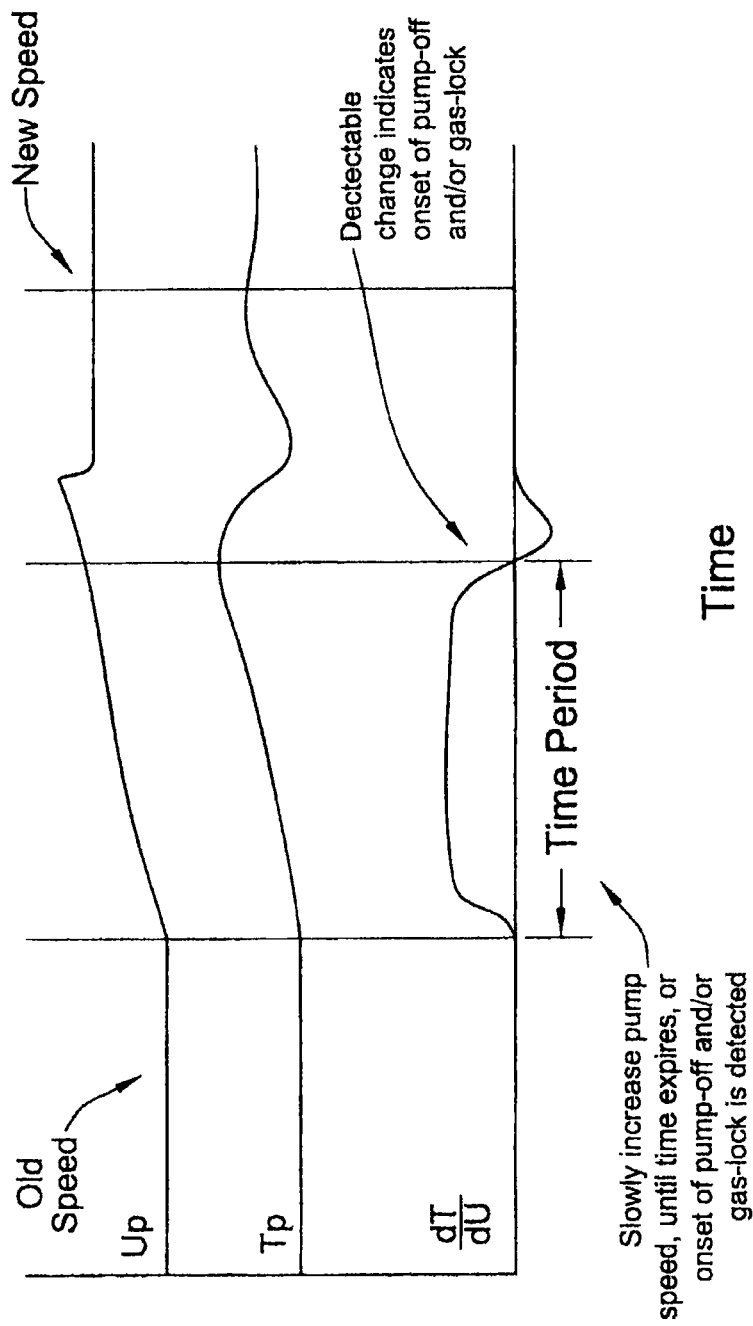

DETERMINATION AND CONTROL OF WELLBORE FLUID LEVEL, OUTPUT FLOW, AND DESIRED PUMP OPERATING SPEED, USING A CONTROL SYSTEM FOR A CENTRIFUGAL PUMP DISPOSED WITHIN THE WELLBORE

CROSS-REFERENCE TO RELATED PATENT APPLICATIONS

This application is a Divisional Application of U.S. patent application Ser. No. 13/445,046, entitled "Determination and Control of Wellbore Fluid Level, Output Flow, and Desired Pump Operating Speed, Using a Control System for a Centrifugal Pump Disposed Within the Wellbore, filed Apr. 12, 2012, now U.S. Pat. No. 8,249,826, which in turn is a Divisional of U.S. patent application Ser. No. 12/987,706, entitled "Determination and Control of Wellbore Fluid Level, Output Flow, and Desired Pump Operating Speed, Using a Control System for a Centrifugal Pump Disposed Within the Wellbore, filed Jan. 10, 2011, now U.S. Pat. No. 8,180,593, issued on May 15, 2012, which in turn is a Divisional of U.S. patent application Ser. No. 12/707,713 entitled "Determination and Control of Wellbore Fluid Level, Output Flow, and Desired Pump Operating Speed, Using a Control System for a Centrifugal Pump Disposed Within the Wellbore" filed on Feb. 18, 2010, now U.S. Pat. No. 7,869,978, issued on Jan. 11, 2011; which is a Divisional of U.S. patent application Ser. No. 11/741,412 entitled "Determination and Control of Wellbore Fluid Level, Output Flow, and Desired Pump Operating Speed, Using a Control System for a Centrifugal Pump Disposed within the Wellbore" filed on Apr. 27, 2007, now U.S. Pat. No. 7,668,694, issued on Feb. 23, 2010, which in turn is a Continuation-in-Part of U.S. patent application Ser. No. 11/502,677 entitled "Control System for Centrifugal Pumps", filed on Aug. 10, 2006, now U.S. Pat. No. 7,558,699, issued on Jul. 7, 2009, which is a Divisional of U.S. patent application Ser. No. 10/656,091 entitled "Control System for Centrifugal Pumps", filed on Sep. 5, 2003, now U.S. Pat. No. 7,117,120, which in turns claims the benefit of and/or priority to: provisional application Ser. No. 60/429,158, entitled "Sensorless Control System for Progressive Cavity and Electric Submersible Pumps", filed on Nov. 26, 2002; and provisional application Ser. No. 60/414,197, entitled "Rod Pump Control System Including Parameter Estimator", filed on Sep. 27, 2002; which eight patent applications are incorporated herein in their entirety by these references.

FIELD OF THE INVENTION

The present invention relates generally to pumping systems, and more particularly, to methods for determining operating parameters and optimizing the performance of centrifugal pumps, which are rotationally driven and characterized by converting mechanical energy into hydraulic energy through centrifugal activity.

BACKGROUND OF THE INVENTION

Centrifugal pumps are used for transporting fluids at a desired flow and pressure from one location to another, or in a recirculating system. Examples of such applications include, but are not limited to: oil, water or gas wells, irrigation systems, heating and cooling systems, multiple pump systems, wastewater treatment, municipal water treatment and distribution systems.

In order to protect a pump from damage or to optimize the operation of a pump, it is necessary to know and control various operating parameters of a pump. Among these are pump speed, pump torque, pump efficiency, fluid flow rate, minimum required suction head pressure, suction pressure, and discharge pressure.

Sensors are frequently used to directly measure pump operating parameters. In many applications, the placement required for the sensor or sensors is inconvenient or difficult to access and may require that the sensor(s) be exposed to a harmful environment. Also, sensors add to initial system cost and maintenance cost as well as decreasing the overall reliability of the system.

Centrifugal pumping systems are inherently nonlinear. This presents several difficulties in utilizing traditional closed-loop control algorithms, which respond only to error between the parameter value desired and the parameter value measured. Also, due to the nature of some sensors, the indication of the measured parameter suffers from a time delay, due to averaging or the like. Consequently, the non-linearity of the system response and the time lag induced by the measured values makes tuning the control loops very difficult without introducing system instability. As such, it would be advantageous to predict key pump parameters and utilize each in a feedforward control path, thereby improving controller response and stability and reducing sensed parameter time delays.

As an example, in a methane gas well, it is typically necessary to pump water off to release trapped gas from an underground formation. This process is referred to as dewatering, where water is a byproduct of the gas production. The pump is operated to control the fluid level within the well, thereby maximizing the gas production while minimizing the energy consumption and water byproduct.

As another example, in an oil well, it is desirable to reduce the fluid level above the pump to lower the pressure in the casing, thereby increasing the flow of oil into the well and allowing increased production. In practice, the fluid level is ideally reduced to the lowest level possible while still providing sufficient suction pressure at the pump inlet. The minimum required suction head pressure of a pump is a function of its design and operating point.

Typically, centrifugal pumps are used for both oil and gas production. As fluid is removed by the pump, the fluid level within the well drops until inflow from the formation surrounding the pump casing equals the amount of fluid being pumped out. It is desirable that the pump flow rate be controlled in a manner precluding the fluid level from being reduced to a point where continued flow from the well is compromised, and/or damage to the pump could occur.

If the fluid level in the well drops too low, undesirable conditions known as "pump-off," or "gas-lock," may occur in the pump. Pump-off occurs when the fluid level in the well has dropped to a point where the pump inlet no longer receives a steady inflow of mostly liquid fluid from the well. Gas-lock occurs, in wells having gas entrained in the fluid, when the fluid level has been reduced to such a low level that fluid pressure at the pump inlet falls below a bubble-point of the fluid, at which larger volumes of free gas are released and enter the pump. Under either a pump-off or gas-lock condition, the pumping action becomes unstable and flow is significantly reduced, with a corresponding reduction in pumping torque and motor current being observed in an electrical motor driven pump.

When a pump-off condition is encountered, it is necessary to slow down, or stop, pumping until the fluid level in the well has been sufficiently replenished, through inflow from the formation surrounding the pump casing to a level whereat the pump-off condition will not be immediately encountered upon re-starting of the pump. With a pump-off condition, it is necessary for the fluid level to rise far enough in the well that the pump inlet can once again receive sufficient inflow of mostly liquid fluid for the pump to function properly. For a gas-lock condition, it is necessary to allow the large volume of gas which caused the gas-lock condition to move upward in the tube, with a corresponding downward movement of non-gaseous fluid within the tube into the pump, so that the pump may once again function properly. Recovery from a gas-lock condition thus also requires slowing down or stopping the pump to allow for movement of gas and liquid within the tube.

As will be readily recognized, by those having skill in the art, if pumping is resumed at the pumping speed which led to either the pump-off or gas-lock condition, it is likely that such a condition would re-occur. Unfortunately, in the past, wellbore pumping systems and controls did not provide a convenient apparatus or method for determining what the maximum pump speed should be, during recovery, in order to preclude triggering a subsequent pump-off and/or gas-lock condition. In the past, motor current was sometimes monitored, and the pump was simply shut down and allowed to stand idle, for a time, whenever the value of pump current dropped below a pre-determined under-load value of current thought to be indicative of a pump-off and/or gas-lock condition. It was then necessary to let the pump remain idle, for an undetermined length of time, so that proper conditions could be re-established at the pump, by virtue of inflow of fluid to the well from the surrounding structure, and/or downward flow of non-gaseous fluid within the outlet tube connected to the pump.

Knowing when to resume pumping, and knowing what reduced pump speed should be utilized following resumption of pumping, to preclude having a recurrence of the pump-off or gas-lock condition, has been largely a matter of trial and error in the past. During the time that the pump is shut down for recovery, no revenue is being generated by the well. In addition, the uncertainty, in the past, with regard to avoiding a pump-off or gas-lock condition, and the time and procedure involved for recovering from such conditions, has led to undesirable wear and tear on the pumping equipment, as well.

It is desirable, therefore, to have an improved apparatus and method for detecting, and precluding a pump-off or gas-lock condition. It is also desirable to have an improved apparatus and method for recovering from a pump-off and/or gas-lock. It is further desirable, to have an improved apparatus and method which is capable of determining what a minimum fluid level in the well should be, in order to preclude a pump-off and/or gas-lock condition, together with a corresponding detection and control apparatus and method for determining a pump speed which will result in maintaining the fluid level at or near the desired minimum fluid level in the well.

Generally, in the past, the fluid level has been sensed with a pressure sensor inserted near the intake or suction side of the pump, typically 1000 to 5000 feet or more below the surface. These down-hole sensors are expensive and suffer very high failure rates, necessitating frequent removal of the pump and connected piping to facilitate repairs. Likewise, the need for surface flow sensors adds cost to the pump system. The elimination of a single sensor improves the installation cost, maintenance cost and reliability of the system.

Also, centrifugal pumps are inefficient when operating at slow speeds and/or flows, wasting electrical power. Therefore, there is a need for a method which would provide reduced flow without sacrificing overall efficiency.

Accordingly, it is an objective of the invention to provide a method for estimating the flow and pressure of a centrifugal pump without the use of down hole sensors. Another objective of the invention is to provide a method for determining pump suction pressure and/or fluid levels in the pumping system using the flow and pressure of a centrifugal pump combined with other pumping system parameters. Another objective of the invention is to provide a method for using closed loop control of suction pressure or fluid level to protect the pump from damage due to low or lost flow. Another objective of the invention is to provide a method for improving the dynamic performance of closed loop control of the pumping system. Other objectives of the invention are to provide methods for improving the operating flow range of the pump, for using estimated and measured system parameters for diagnostics and preventive maintenance, for increasing pumping system efficiency over a broad range of flow rates, and for automatically controlling the casing fluid level by adjusting the pump speed to maximize gas production from coal bed methane wells.

The apparatus of the present invention must also be of construction which is both durable and long lasting, and it should also require little or no maintenance by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

BRIEF SUMMARY OF THE INVENTION

The disadvantages and limitations of the background art discussed above are overcome by the present invention. With this invention, there is provided a method of continuously determining operational parameters of a down hole pump used in oil, water or gas production. In one embodiment, wherein the pump is a centrifugal pump, the pump is rotationally driven by an AC electrical drive motor having a rotor coupled to the pump for rotating the pump element. In deep wells, it is common practice to use an AC electrical drive motor designed to operate at voltages that are several times that of conventional industrial motors. This allows the motors to operate at lower currents, thereby reducing losses in the cable leading from the surface to the motor. In those cases, a step up transformer can be used at the surface to boost the typical drive output voltages to those required by the motor.

In one form of the invention, a method comprises the steps of continuously measuring above ground the electrical voltages applied to the cable leading to the drive motor to produce electrical voltage output signals; continuously measuring above ground the electrical currents applied to the drive motor through the cable to produce electrical current output signals; using a mathematical model of the cable and motor to derive values of instantaneous electrical torque from the electrical voltage output signals and the electrical current output signals; using a mathematical model of the cable and motor to derive values of instantaneous motor velocity from the electrical voltage output signals and the electrical current output signals; and using mathematical pump and system models and the instantaneous motor torque and velocity values to calculate instantaneous values of operating parameters of the centrifugal pump system. In systems using a step up transformer, electrical voltages and currents can be measured at the input to the step up transformer and a mathematical model of the step up transformer can be used to calculate the voltages and currents being supplied to the cable leading to the motor. In one embodiment, the method is used for calculating pump flow rate, head pressure, minimum required suction head pressure, suction pressure, and discharge pressure. In another embodiment, used when accurate calculation of pump flow rate is difficult or impossible, the flow rate is measured above ground in addition to determining the motor currents and motor voltages, and the method is used to calculate head pressure, minimum required suction head pressure, suction pressure, and discharge pressure.

The invention provides a method and apparatus, for deriving pump flow rate and head pressure from the drive motor and pumping unit parameters without the need for external instrumentation, and in particular, down hole sensors. The self-sensing control arrangement provides nearly instantaneous readings of motor velocity and torque which can be used for both monitoring and real-time, closed-loop control of the centrifugal pump. In addition, system identification routines are used to establish parameters used in calculating performance parameters that are used in real-time closed-loop control of the operation of the centrifugal pump.

In one embodiment, wherein the operating parameters are pump head pressure and flow rate, the method includes the steps of using the calculated value of the flow rate at rated speed of the pump under the current operating conditions and the instantaneous value of motor speed to obtain pump efficiency and minimum required suction head pressure. The present invention includes the use of mathematical pump and system models to relate motor torque and speed to pump head pressure, flow rate and system operational parameters. In one embodiment, this is achieved by deriving an estimate of pump head pressure and flow rate from motor currents and voltage measurements which are made above ground. The results are used to control the pump to protect the pump from damage, to estimate system parameters, diagnose pumping system problems and to provide closed-loop control of the pump in order to optimize the operation of the pump. Protecting the pump includes detecting blockage, cavitation, and stuck pump. Comparisons of calculated flow estimates and surface flow measurements can detect excess pump wear, flow blockage, and tubing leaks.

The operation of a centrifugal pump is controlled to enable the pump to operate periodically, such that the pump can achieve a broad average flow range while maintaining high efficiency. This obviates the need to replace a centrifugal pump with another pump, such as a rod beam pump, when fluid level or flow in the well decreases over time. In accordance with another aspect of the invention, a check valve is used to prevent back flow during intervals in which the pump is turned off.

In accordance with a further aspect of the invention, an optimizing technique is used in the production of methane gas wherein it is necessary to pump water off an underground formation to release the gas. The optimizing technique allows the fluid level in the well to be maintained near an optimum level in the well and to maintain the fluid at the optimum level over time by controlling pump speed to raise or lower the fluid level as needed to maintain the maximum gas production.

This is done by measuring and/or calculating fluid flow, gas flow, casing gas pressure, and fluid discharge pressure at the surface. Selected fluid levels are used to define a sweet zone. This can be done manually or using a search algorithm. The search algorithm causes the fluid level to be moved up and down, searching for optimum performance. The search algorithm can be automatically repeated at preset intervals to adjust the fluid level to changing well conditions.

The invention also provides an improved method and apparatus for determining a fluid level in a wellbore, or the like, where the wellbore or the like extends downward from a surface and has a centrifugal pump disposed therein for transferring fluid within the wellbore, or the like, by determining a zero-flow input speed to the centrifugal pump at which output flow from the centrifugal pump is substantially zero, and using the zero-flow input speed to calculate the fluid level in the wellbore, or the like.

By the term wellbore, or "wellbore or the like", the inventors mean to include all applications having structural and/or functional similarity to a wellbore. Such structure would include, but not be limited to: wellbores; well casings; fluid tanks; and reservoirs.

The invention may be used for the sole purpose of calculating the fluid level in the wellbore. In other forms of the invention, the fluid level in the wellbore, calculated in accordance with the invention, may be utilized for other purposes, in accordance with the invention, such as for controlling the centrifugal pump, or for controlling the fluid level in the wellbore. In some forms of the invention, the zero-flow input speed of the centrifugal pump at which the output flow from the centrifugal pump becomes substantially zero is determined without using output flow from the centrifugal pump as part of the determination. In other forms of the invention, a flow meter located on the surface may be used for determining the zero-flow input speed of the centrifugal pump.

The zero-flow input speed may be determined by monitoring input torque to the centrifugal pump as the input speed is reduced, and detecting the zero-flow input speed as an input speed at which an incremental reduction and input speed results in a distinct drop or other change in the input torque.

Specifically, in some forms of the invention, zero-flow speed is detected by monitoring the differential of input torque as a function of input speed, while the input speed is incrementally reduced, with the zero-flow speed being determined to be substantially the input speed at which the differential of input torque as a function of input speed achieves a maximum value. Alternatively, the zero-flow speed may be determined to be the speed at which the differential of input torque as a function of input speed falls below a selected minimum value that is less than the maximum monitored value of the differential of input torque as a function of input speed. The selected minimum value of the differential of input torque as a function of input speed may be a positive, negative, or equal to zero, in various forms of the invention.

The zero-flow input speed may alternatively be determined by monitoring other appropriate combinations of various motor and/or pump parameters, as the input speed is reduced, and detecting the zero-flow input speed as a value of the monitored parameters at which an incremental reduction in input speed results in a distinct drop or other change in the monitored combination of parameters. For example, the zero-flow input speed may be determined by monitoring the differential of motor current as a function of input speed as the input speed is reduced, and detecting the zero-flow input speed as an input speed at which an incremental reduction in input speed results in a distinct change in the motor current. In similar fashion, the zero-flow input speed may be determined by monitoring the differential of motor current as a function of motor frequency as the motor electrical frequency is reduced, and calculating the zero-flow input speed from the frequency at which an incremental reduction in frequency results in a distinct change in the motor current.

In determining the zero-flow input speed of the motor, in accordance with the invention, as described above, it will be understood that the pump input speed will generally equal the motor speed, and that the pump input torque will equal the motor torque, where the motor is directly coupled to the pump. Those having skill in the art will readily recognize, however, that the invention may also be practiced in systems having the pump indirectly coupled to the motor, through intervening gearboxes or other drive elements, by incorporating appropriate conversion factors reflecting the intervening drive elements into the calculations disclosed herein in the manner known in the art.

The invention may further include using an affinity law for calculating a zero-flow pump differential pressure at the zero-flow input speed, and using the zero-flow pump differential pressure for calculating the fluid level in the wellbore. The zero-flow pump differential pressure thus calculated is an approximation of the pressure being generated in the centrifugal pump, between the intake and outlet of the pump. In practicing the invention, pressure may be expressed as an absolute pressure, or alternatively in linear units of lift height, as is customary in some industries, so long as consistency and harmonization of units is maintained.

A desired or nominal, rated-operating input speed of the centrifugal pump may be selected and utilized for determining a rated-output pressure of the centrifugal pump when producing output flow at the rated-operating input speed and rated-output pressure. The zero-flow pump differential pressure at the zero-flow input speed may be calculated, using affinity laws, by multiplying the rated-operating output pressure by an appropriate power (such as the square for example) of the quotient of the zero-flow input speed divided by the rated-operating input speed of the centrifugal pump. Alternatively, look-up tables may be utilized.

In some forms of the invention, the centrifugal pump includes an output (i.e. discharge) thereof connected to an output tube extending upward from the pump through the wellbore to the surface. The wellbore may define a depth of the pump inlet, and fluid within the tube may define a specific weight and an internal pressure of the fluid within the tube at the surface of the wellbore or the like. The zero-flow discharge pressure of the pump (i.e. pressure at the pump outlet) may be calculated by subtracting the length of the pump (i.e. the vertical distance between the inlet and the outlet of the pump) from the depth of the pump inlet, multiplying the resulting difference by the fluid specific weight in the tube, and adding to the product formed thereby the internal pressure of the fluid within the tube at the surface.

In certain embodiments of the invention, the length of the pump may be ignored without significantly affecting the results of the above calculation. For example, even though a centrifugal pump of the type used in an oil or gas well may have a length of thirty feet, or so, the length of the pump is diminimus in comparison to the depth of the pump inlet which is often as much as 5000 feet below the surface of the ground.

The invention may further include calculating an intake pressure of the centrifugal pump by subtracting the zero-flow pump differential pressure from the zero-flow discharge pressure of the pump. Where the wellbore defines a casing pressure at the surface, and fluid in the wellbore defines a specific weight of the fluid in the wellbore, the invention may further include calculating the fluid level in the wellbore by subtracting the casing pressure from the intake pressure of the centrifugal pump, and dividing the resulting difference by the specific weight of the fluid in the wellbore.

In some forms of the invention, a flow rate may be determined for a centrifugal pump operating at a selected pump speed while disposed in a wellbore for transferring fluid in the wellbore, without directly measuring the flow rate, by calculating the flow rate as a function of the selected speed and a fluid level in the wellbore. The calculated flow rate may be used for controlling the centrifugal pump. For example, in some forms of the invention, the calculated flow may be used for controlling speed of the centrifugal pump to a selected minimum rated speed so that the pump speed is always greater than or equal to the selected minimum speed of the pump, to thereby ensure that pump speed is always held at a safe distance above the zero-flow speed.

Calculation of a flow rate from a centrifugal pump, as a function of the selected speed and a fluid level in a wellbore, may further include a preliminary step of determining the fluid level in the wellbore, according the methods of the present invention. This aspect of the invention provides particular advantage in applications where electrically driven submersible pumps exhibit only very small changes in pump power or torque as the flow changes through the pump, or in systems having pumps with pump curves that are not strictly monotonic, with a maximum occurring near the pump Best Efficiency Point (BEP). In such pumps, determination of pump flow, using only input speed and torque in the manner described herein with regard to other aspects of the invention, can be difficult. By determining the flow rate of the centrifugal pump as a function of a selected pump speed and the fluid level in the wellbore, the flow rate may be determined, according to the invention, without the need for having a flow sensor for directly measuring the flow, thereby reducing complexity and improving reliability through practice of the invention.

In some forms of the invention, the flow rate from a centrifugal pump may be determined, utilizing a fluid level in the wellbore measured by any appropriate method known in the art, such as physical measurement, or through acoustic reflection. According to some aspects of the invention, the flow rate may be determined as a function of a fluid level which is determined, in accordance with the invention, by determining a zero-flow input speed of the centrifugal pump at which output flow from the centrifugal pump is substantially zero, and using the zero flow input speed to calculate the fluid level in the wellbore.

The invention may further include controlling the centrifugal pump to maintain a minimum flow rate of the pump at a value greater than zero.

Where a centrifugal pump is connected to an outlet tubing system, the invention may include calculating a flow from the centrifugal pump by performing steps including: determining a combined characteristic equation for the centrifugal pump operating in the system as a function of the fluid level in the wellbore; solving the combined characteristic equation for a zero-flow pump speed and; and, solving for the pump flow as a function of a selected pump speed which is greater than a zero-flow speed of the pump. Determining the combined characteristic equation may be accomplished, in some forms of the invention, by fitting a curve or a table to the system head loss equations, according to a Moody/Darcy-Weisbach analysis, at pump flows within the operating range of the system. The combined characteristic equation may then be solved for a zero-flow pump speed. Once the zero-flow pump speed is known, the combined characteristic equation for pump flow may be utilized to solve for pump flow at any pump speed greater than the zero-flow speed.

The invention also provides an improved apparatus and method for detecting and dealing with a pump-off or gas-lock condition in a wellbore. The invention also provides an apparatus and method for periodic determination of a minimum fluid depth and/or maximum pump speed at which the well may be operated continuously without encountering a pump-off or gas-lock condition. The invention further provides a method and apparatus for controlling the well in a manner allowing pumping at a maximum sustainable rate, while precluding the possibility of encountering a pump-off or gas-lock condition, during either normal continuous operation of the well or recovery from a pump-off or gas-lock condition. The invention also provides an apparatus and method for automatically periodically adjusting the pump speed, if necessary, to maintain a maximum pumping rate from the well.

The invention may be utilized for detecting the onset of a pump-off and/or gas-lock condition by monitoring an appropriate parameter, such as pump input torque or current to an electric motor driving the pump, or a derivative or other computed value as a function of the monitored parameter. In one form of the invention, the onset of a pump-off and/or gas-lock condition is detected when motor current or torque drops below an under load value. Unlike prior systems and methods, however, which required that the pump be shut down following detection of a pump-off and/or gas-lock condition, the invention allows the pump to be controlled in such a manner that it can continue to operate at a reduced speed, during the period of time that the well is recovering from the pump-off and/or gas-lock condition.

In some forms of a method and apparatus, according to the invention, a periodic test is performed to determine if the pump can be safely run at a higher speed, without risk of instigating a pump-off and/or gas-lock condition. In accordance with this aspect of the invention, the pump speed is periodically increased, over a predetermined time period, by ramping up, or otherwise increasing the pump speed in a controlled manner. As the pump speed is increased, a parameter such as pump torque, or input current to the motor, is monitored, in addition to the pump speed. The onset of a pump-off and/or gas-lock condition may be determined by monitoring the differential of the selected parameter (i.e. torque or current) as a function of motor speed, as the pump speed is increased, and detecting the speed at which pump-off and/or gas-lock is triggered, to be the pump speed at which an incremental reduction in pump speed results in a distinct change in the monitored parameter. The pump speed may then be reduced below the speed at which the onset of pump-off and/or gas-lock was determined to occur. The invention may include reducing the speed by a selected offset value below the determined onset speed. In some forms of the invention, the offset may be adjustable.

If no onset of pump-off and/or gas-lock is detected during the time period in which the pump speed is being increased, the pump speed may be reset to the maximum value achieved during the monitoring period, for continuous safe operation at that speed. After a short period of operation at the increased speed, the periodic test for onset of pump-off and/or gas-lock may be repeated, to determine whether the pump may be operated at a yet higher speed.

The periodic test for determining a maximum safe pumping speed may be utilized during the period of time after an unanticipated onset of pump-off and/or gas-lock, to determine a safe reduced speed at which the pump may be operated while the well is recovering from the pump-off and/or gas-lock condition. Following recovery of the well, the periodic test, according to the invention, may be utilized in conjunction with control aspects of the invention, for determining a new maximum continuous operating speed for the pump, and automatically controlling the pump at the new maximum safe operating speed for the well. By performing the periodic test and controlling the pump accordingly, on an ongoing basis, the pump will always run at the proper maximum pumping speed, automatically, without interruption in production of the well.

In some forms of the invention, the pump may be controlled to slow down to a preset reduced speed, upon detection of the onset of a pump-off and/or gas-lock condition. In other forms of the invention, the motor may be controlled to drive the pump at an appropriate reduced speed, determined in accordance with the invention, to operate the pump "right on-the-edge" of triggering a pump-off and/or gas-lock condition.

The invention may take various forms, including a method, an apparatus, or a computer-readable medium, having computer executable instructions, or performing the steps of a method, or controlling an apparatus according to the invention.

Uses of the self-sensing pump control system also include, but are not limited to HVAC systems, multi-pump control, irrigation systems, wastewater systems, and municipal water systems.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 23 is a graphical illustration showing operation of an apparatus or method, according to the invention, for automatically determining, on a periodic basis, a maximum pumping speed for continued operation of a system according to the invention, in a manner precluding instigation of a pump-off and/or gas-lock condition.

Variables used throughout the drawings generally have the following form: A variable with a single subscript indicates that the reference is: to an actual element of the system, as in Tm for the torque of the motor; a value that is known in the system and is stable, as in Xp for the depth of the pump; for a rated value, such as Hr for rated differential pressure of the pump. A variable with a second subscript of 'm', as in Vmm for measured motor voltage, indicates that the variable is measured on a real-time basis. Similarly, a second subscript of 'e' indicates an estimated or calculated value like Tme for estimated motor torque; a second subscript of 'c' indicates a command like Vmc for motor voltage command; and a second subscript of 'f' indicates a feedforward command like Umf for motor speed feedforward command. Variables having a second or third subscript of "z," indicate that the variable applies at a zero-flow condition of the pump, as in Hpz for head pressure developed by the pump at a zero flow condition, corresponding to a zero-flow speed Upz, whereat the pump speed Up has been reduced to a point where flow from the pump ceases. Variables in bold type, as in Vs for stator voltage, are vector values having both magnitude and direction.

The meanings of other variables without subscripts, or having specialized single or multiple subscripts relating to certain specific aspects of the invention will be further defined or apparent from the context in which they are used herein.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
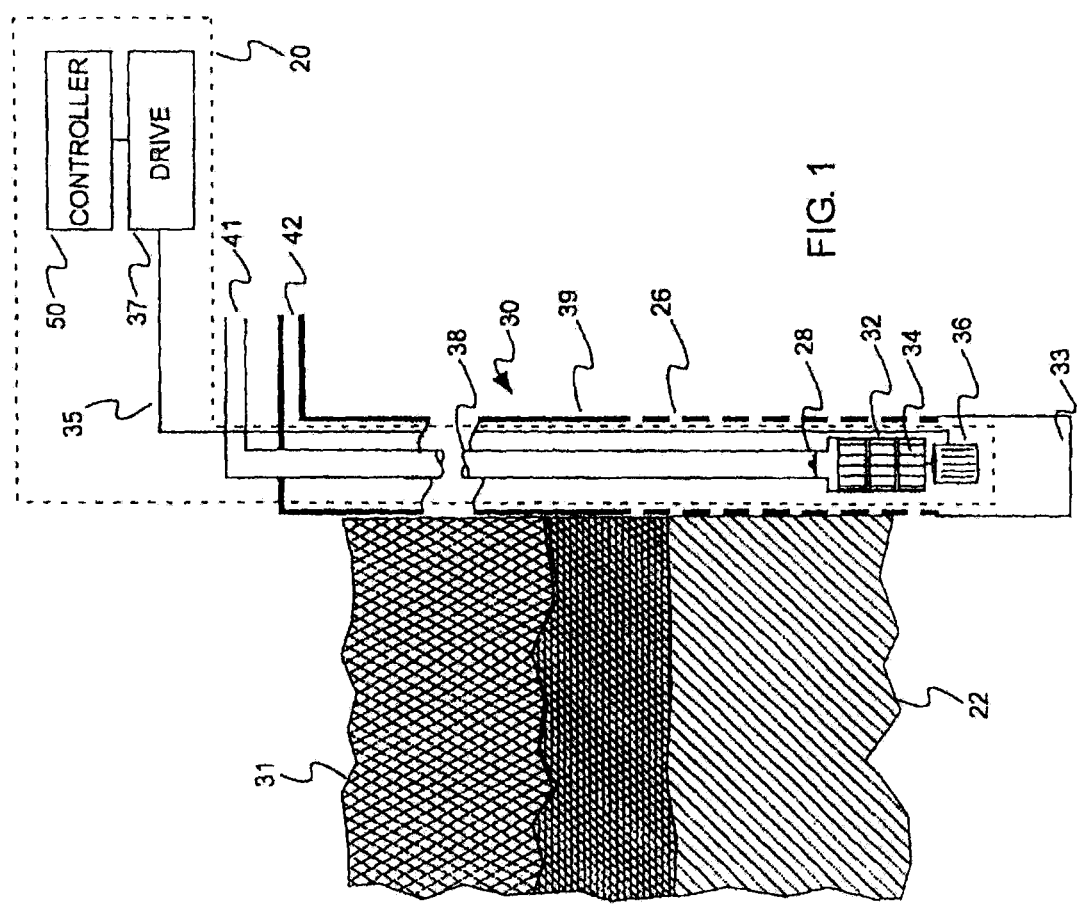
FIG. 1 is a simplified representation of a well including a centrifugal pump, the operation of which is controlled by a pump control system in accordance with the present invention.

Referring to FIG. 1, the present invention is described with reference to an oil well 30 wherein oil is to be pumped from an underground formation 22. The well includes an outer casing 39 and an inner tube 38 that extend from ground level to as much as 1000 feet or more below ground level. The casing 39 has perforations 26 to allow the fluid in the underground formation to enter the wellbore. It is to be understood that water and gas can be combined with oil and the pump can be used for other liquids. The control apparatus can also be used for pumping water only. The bottom of the tube generally terminates below the underground formations.

A centrifugal pump of the type known as an electric submersible pump (ESP) 32 is mounted at the lower end of the tube 38 and includes one or more centrifugal pump members 34 mounted inside a pump housing. The pump members are coupled to and driven by a drive motor 36 which is mounted at the lower end of the pump housing. The tube 38 has a liquid outlet 41 and the casing 39 has a gas outlet 42 at the upper end above ground level 31. An optional check valve 28 may be located on the discharge side of the pump 32 to reduce back flow of fluid when the pump is off. These elements are shown schematically in FIG. 1.

The operation of the pump 32 is controlled by a pump control system and method including a parameter estimator in accordance with the present invention. For purposes of illustration, the pump control system 20 is described with reference to an application in a pump system that includes a conventional electric submersible pump. The electric submersible pump includes an electric drive system 37 connected to motor 36 by motor cables 35. A transformer (not shown) is sometimes used at the output of the drive to increase voltage supplied to the motor. The motor rotates the pump elements that are disposed near the bottom 33 of the well. The drive 37 receives commands from controller 50 to control its speed. The controller 50 is located above ground and contains all the sensors and sensor interface circuitry and cabling necessary to monitor the performance of the pump system.

The motor 36 can be a three-phase AC induction motor designed to be operated from line voltages in the range of 230 VAC to several thousand VAC and developing 5 to 500 horsepower or higher, depending upon the capacity and depth of the pump.

Pump Control System

Figure 2:
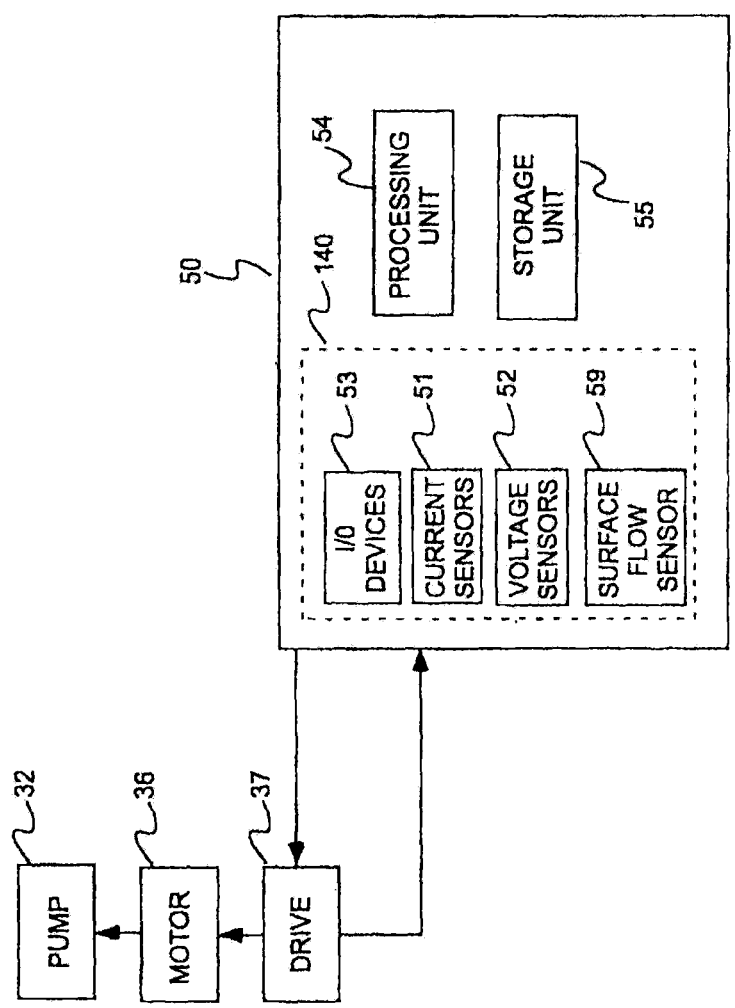
FIG. 2 is a block diagram of the centrifugal pump control system of FIG. 1.

Referring to FIG. 2, there is shown a simplified representation of the pump control system 20 for the pump 32. The pump control system 20 controls the operation of the pump 32. In one embodiment, the casing fluid level is estimated using pump flow rate and head pressure estimates which, in turn, can be derived from values of motor speed and torque estimates. The pump flow rate and head pressure estimates are combined with system model parameters to produce a casing fluid level estimate. In one preferred embodiment, a pump model and system model are used to produce estimated values of pump flow rate and casing fluid level for use by a pump controller in producing drive control signals for the pump 32.

Alternatively, the measured discharge flow rate of the pump 32 can be obtained using measurements from the surface flow sensor 59 and combined with the estimates produced by the pump and system models to produce the casing fluid level estimate. This is particularly useful when the configuration of the pump makes it difficult to accurately calculate pump flow rate from the mechanical inputs to the pump.

While in a primary function the estimated parameters are used for control, the parameters also can be used for other purposes. For example, the estimated parameters can be compared with those measured by sensors or transducers for providing diagnostics alarms. The estimated parameters may also be displayed to setup, maintenance or operating personnel as an aid to adjusting or troubleshooting the system.

In one embodiment, values of flow and pressure parameters are derived using measured or calculated values of instantaneous motor currents and voltages, together with pump and system parameters, without requiring down hole sensors, fluid level meters, flow sensors, etc. The flow and pressure parameters can be used to control the operation of the pump 32 to optimize the operation of the system. In addition, pump performance specifications and system identification routines are used to establish parameters used in calculating performance parameters that are used in real time closed-loop control of the operation of the pump.

The pump control system 20 includes transducers, such as above ground current and voltage sensors, to sense dynamic variables associated with motor load and velocity. The pump control system further includes a controller 50, a block diagram of which is shown in FIG. 2. Above ground current sensors 51 of interface devices 140 are coupled to a sufficient number of the motor cables 35, two in the case of a three phase AC motor. Above ground voltage sensors 52 are connected across the cables leading to the motor winding inputs. The current and voltage signals produced by the sensors 51 and 52 are supplied to a processing unit 54 of the controller 50 through suitable input/output devices 53. The controller 50 further includes a storage unit 55 including storage devices which store programs and data files used in calculating operating parameters and producing control signals for controlling the operation of the pump system. This self-sensing control arrangement provides nearly instantaneous estimates of motor velocity and torque, which can be used for both monitoring and real-time, closed-loop control of the pump. For example, in one embodiment, instantaneous estimates of motor velocity and torque used for real-time, closed-loop control are provided at the rate of about 1000 times per second.

Motor currents and voltages are sensed or calculated to determine the instantaneous speed and torque produced by the electric motor operating the pump. As the centrifugal pump 32 is rotated, the motor 36 is loaded. By monitoring the motor currents and voltages above ground, the calculated torque and speed produced by the motor 36, which may be below ground, are used to calculate estimates of fluid flow and head pressure produced by the pump 32.

More specifically, interface devices 140 include the devices for interfacing the controller 50 with the outside world. None of these devices are located below ground. Sensors in blocks 51 and 52 can include hardware circuits which convert and calibrate the current and voltage signals into current and flux signals. After scaling and translation, the outputs of the voltage and current sensors can be digitized by analog to digital converters in block 53. The processing unit 54 combines the scaled signals with cable and motor equivalent circuit parameters stored in the storage unit 55 to produce a precise calculation of motor torque and motor velocity. Block 59 contains an optional surface flow meter which can be used to measure the pump flow rate. Block 59 may also contain signal conditioning circuits to filter and scale the output of the flow sensor before the signal is digitized by analog to digital converters in Block 53.

Pump Control

Figure 3:
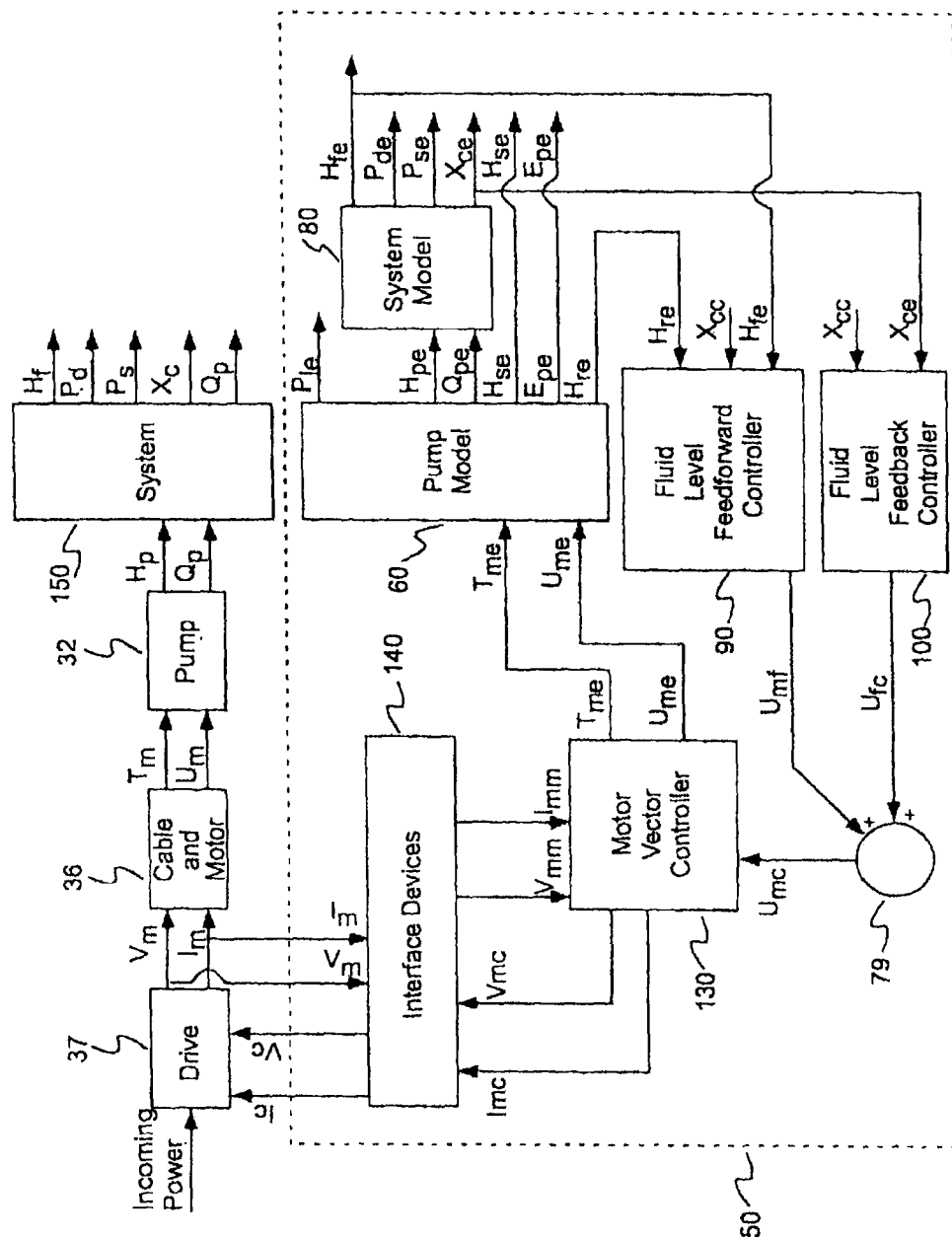
FIG. 3 is a functional block diagram of a pump control system for the centrifugal pump of FIG. 1 when using estimated flow.

Referring to FIG. 3, which is a functional block diagram of the pump control system 20 for a pump 32 where the pump flow rate to pump power relationship allows pump flow rate to be calculated, the pump 32 is driven by a drive 37 and motor 36 to transfer fluid within a system 150. The operation of the motor 36 is controlled by the drive 37 and controller 50 which includes a pump model 60, system model 80, fluid level feedforward controller 90, fluid level feedback controller 100, motor vector controller 130 and interface devices 140.

More specifically, Block 140, which is located above ground, can include hardware circuits which convert and calibrate the motor current signals Im (consisting of individual phase current measurements Ium and Ivm in the case of a three phase motor) and voltage signals Vm (consisting of individual phase voltage measurements Vum, Vvm, and Vwm in the case of a three phase motor) into motor current and flux signals. After scaling and translation, the outputs of the voltage and current sensors can be digitized by analog to digital converters into measured voltage signals Vmm and measured current signals Imm. The motor vector controller 130 combines the scaled signals with cable and motor equivalent circuit parameters to produce a precise calculation of motor electrical torque Tme and velocity Ume. Automatic identification routines can be used to establish the cable and motor equivalent circuit parameters.

Figure 13:
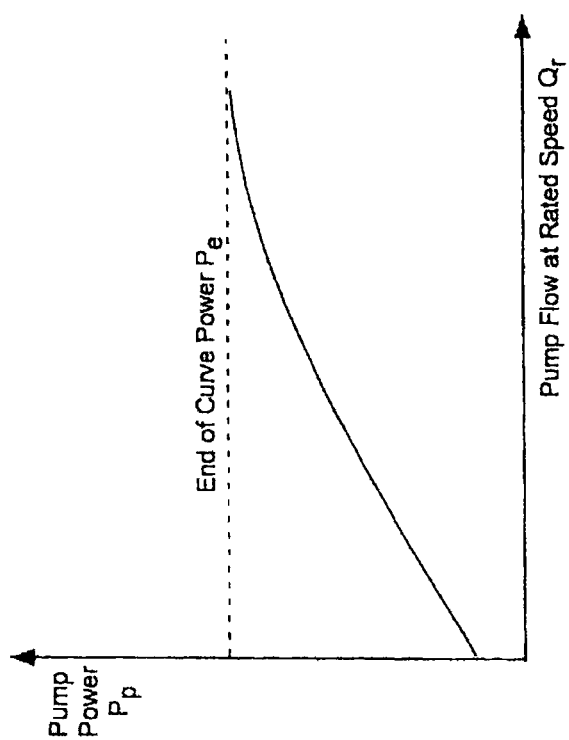

The pump model 60 calculates the values of parameters, such as pump flow rate Qpe, pump head pressure Hpe, pump head pressure at rated speed Hre, minimum required suction head pressure Hse, pump efficiency Epe, and pump safe power limit Ple relating to operation of the pump 32 from inputs corresponding to motor torque Tme and motor speed Ume without the need for external flow or pressure sensors. This embodiment is possible for pumps where the relationship of pump flow rate to pump power at rated speed, as shown in FIG. 13, is such that each value of power has only one unique value of pump flow rate associated with it throughout the range of pump flows to be used. Further, the system model 80 derives estimated values of the pump suction pressure Pse, flow head loss Hfe, pump discharge pressure Pde and the casing fluid level Xce from inputs corresponding to discharge flow rate value Qpe and the head pressure value Hpe of the pump. The fluid level feedforward controller 90 uses the pump head pressure at rated speed value Hre, flow head loss value Hfe and commanded fluid level Xcc to calculate a motor speed feedforward command Umf. The fluid level feedback controller 100 compares the commanded fluid level Xcc with static and dynamic conditions of the fluid level value Xce to calculate a motor velocity feedback command Ufc. Motor velocity feedback command Ufc and feedforward command Umf are added in summing Block 79 to yield the motor velocity command Umc.

Motor vector controller 130 uses the motor speed command Umc to generate motor current commands Imc and voltage commands Vmc. Interface devices in Block 140, which can be digital to analog converters, convert the current commands Imc and voltage commands Vmc into signals which can be understood by the drive 37. These signals are shown as Ic for motor current commands and Vc for motor winding voltage commands. In installations with long cables and/or step up transformers, the signals Ic and Vc would be adjusted to compensate for the voltage and current changes in these components.

Figure 4:
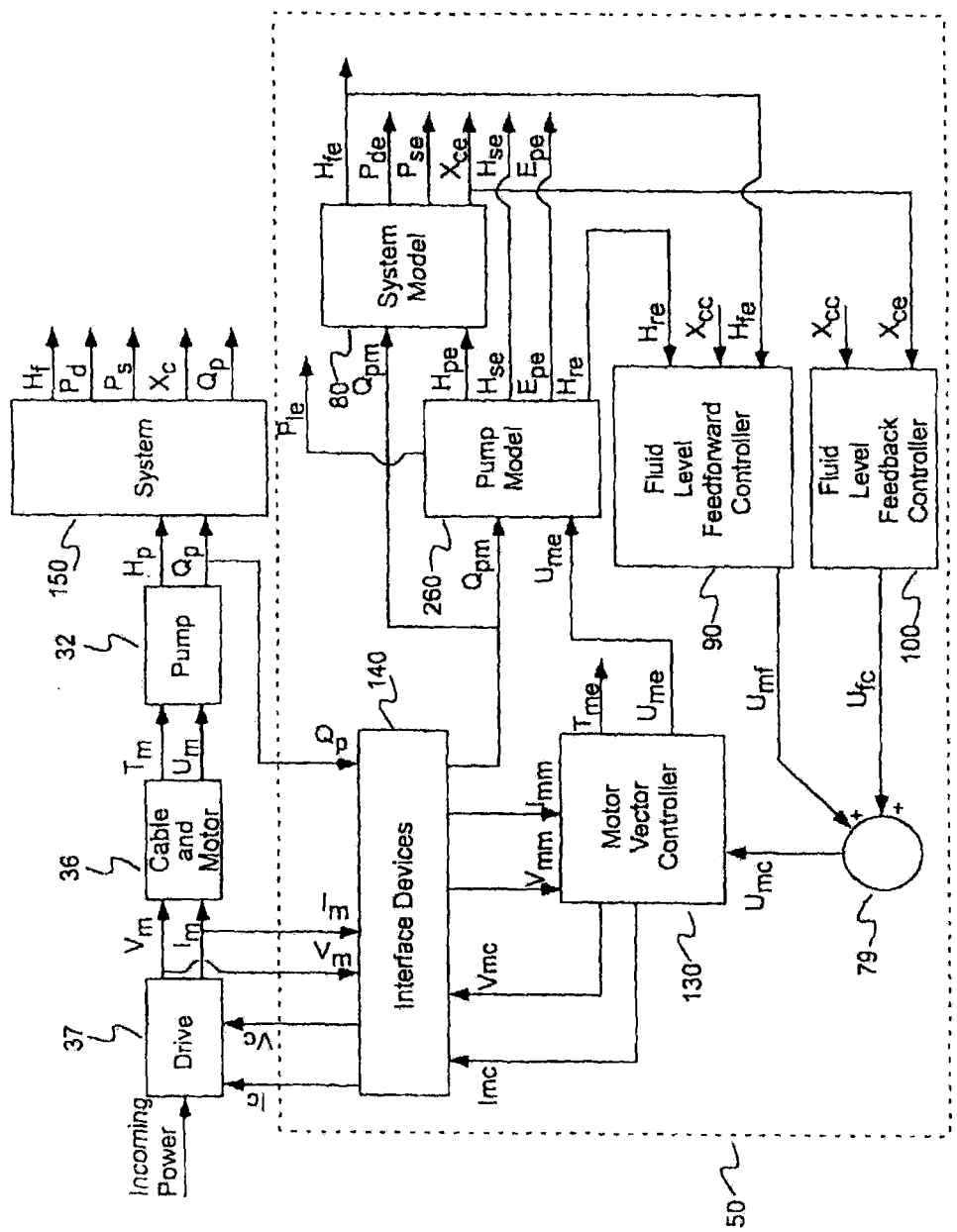
FIG. 4 is a functional block diagram of a pump control system for the centrifugal pump of FIG. 1 when using measured flow.

Referring to FIG. 4, which is a functional block diagram of the pump control system 20 for a pump 32 where the pump flow rate is measured above ground, the pump 32 is driven by a drive 37 and motor 36 to transfer fluid within a system 150. The operation of the motor 36 is controlled by the drive 37 and controller 50 which includes a pump model 260, system model 80, fluid level feedforward controller 90, fluid level feedback controller 100, motor vector controller 130 and interface devices 140.

More specifically, Block 140, which is located above ground, can include hardware circuits which convert and calibrate the motor current signals Im (consisting of individual phase current measurements Ium and Ivm in the case of a three phase motor) and voltage signals Vm (consisting of individual phase voltage measurements Vum, Vvm, and Vwm in the case of a three phase motor) into motor current and flux signals. After scaling and translation, the outputs of the voltage and current sensors can be digitized by analog to digital converters into measured voltage signals Vmm and measured current signals Imm. The motor vector controller 130 combines the scaled signals with cable and motor equivalent circuit parameters to produce a precise calculation of motor electrical torque Tme and velocity Ume. Automatic identification routines can be used to establish the cable and motor equivalent circuit parameters.

In this embodiment, Block 140 also may contain hardware circuits which convert above ground flow rate into an electrical signal that can be digitized by analog to digital converters into the measured flow signal Qpm for use by the pump model 260 and the system model 80.

The pump model 260 calculates the values of parameters pump head pressure Hpe, pump head pressure at rated speed Hre, minimum required suction head pressure Hse, pump efficiency Epe, and pump safe power limit Ple relating to operation of the pump 32 from inputs corresponding to flow Qpm as measured by a flow sensor and motor speed Ume without the need for other external sensors. This embodiment is used for pumps where the relationship of pump flow rate to pump power at rated speed is such that there is not a unique pump flow rate for each value of pump power. Further, the system model 80 derives estimated values of the pump suction pressure Pse, flow head loss Hfe, pump discharge pressure Pde and the casing fluid level Xce from inputs corresponding to discharge flow rate value Qpm and the head pressure value Hpe of the pump. The fluid level feedforward controller 90 uses the motor speed value Ume, flow head loss value Hfe and commanded fluid level Xcc to calculate a motor speed feedforward command Umf. The fluid level feedback controller 100 compares the commanded fluid level Xcc with static and dynamic conditions of the fluid level value Xce to calculate a motor velocity feedback command Ufc. Motor velocity feedback command Ufc and feedforward command Umf are added in summing Block 79 to yield the motor velocity command Umc.

Motor vector controller 130 uses the motor speed command Umc to generate motor current commands Imc and voltage commands Vmc. Interface devices in Block 140, which can be digital to analog converters, convert the current commands Imc and voltage commands Vmc into signals which can be understood by the drive 37. These signals are shown as Ic for motor current commands and Vc for motor winding voltage commands. In installations with long cables and/or step up transformers, the signals Ic and Vc would be adjusted to compensate for the voltage and current changes in these components.

The controller 50 provides prescribed operating conditions for the pump and/or system. To this end, either pump model 60 or pump model 260 also can calculate the efficiency Epe of the pump for use by the controller 50 in adjusting operating parameters of the pump 32 to determine the fluid level Xc needed to maximize production of gas or produced fluid and/or the fluid level Xc needed to maximize production with a minimum power consumption.

Figure 8:
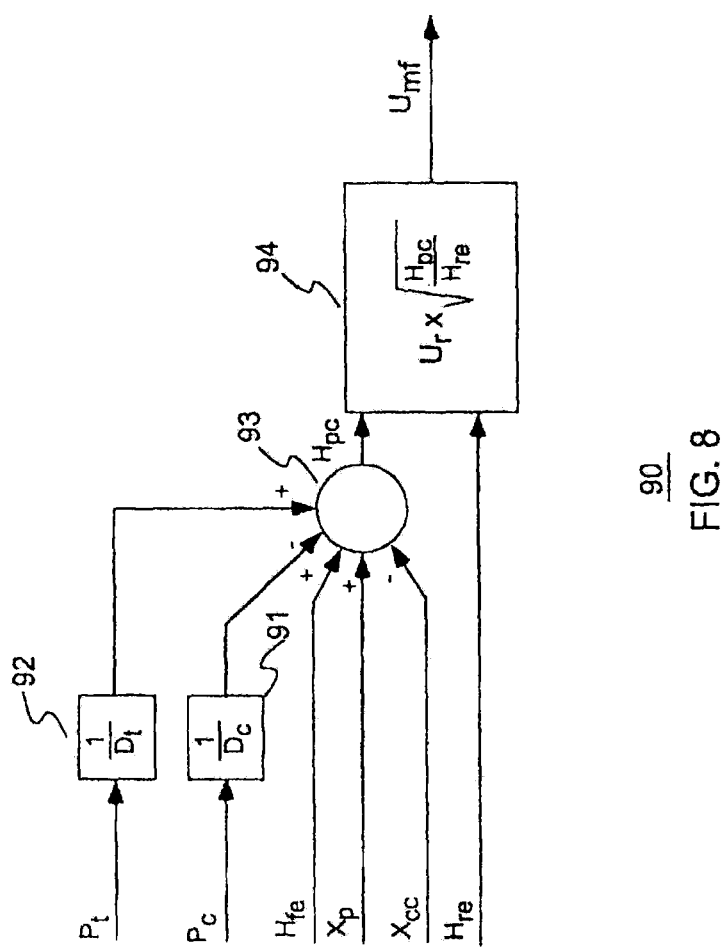
FIG. 8 is a diagram of an algorithm for a fluid level feed-forward controller of the centrifugal pump control system of FIGS. 3 and 4.

The controller 50 (FIG. 3 and FIG. 4) uses the parameter estimates to operate the pump so as to minimize energy consumption, optimize gas flow, and maintain the fluid level to accomplish the objectives. Other inputs supplied to the controller 50 include the commanded casing fluid level Xcc and values representing casing pressure Pc and tubing pressure Pt (FIG. 8). Values representing casing pressure Pc and tubing pressure Pt may each be preset to approximate values as part of the system setup or, as is preferable in situations where these values are likely to vary during operation of the system, the controller 50 can use values measured by sensors mounted above ground and connected to the controller 50 through appropriate signal conditioning and interface circuitry.

The controller 50 (FIG. 3 and FIG. 4) optimizes use of electrical power as the flow delivery requirements change and can determine fluid level without using down hole sensors and, in one preferred embodiment, without using surface flow sensors. As will be shown, the control operations provided by the controller 50 include the use of the pump model 60 (FIG. 3) or pump model 260 (FIG. 4) and system model 80 (FIG. 3 or FIG. 4) to relate mechanical pump input to output flow rate and head pressure. In one embodiment (FIG. 3), this is achieved by deriving an estimate of pump flow rate from above ground measurements of motor current and voltage. In another embodiment (FIG. 4), the pump flow rate is measured using a surface flow sensor. From the flow value thus obtained, the pump head pressure, efficiency and other pump operating parameters are determined using pump curve data. The results are used to control the pump 32 to protect it from damage and to provide closed-loop control of the pump 32 in order to optimize the operation of the pumping system. Protecting the pump 32 includes detecting blockage, cavitation, and stuck pump.

Moreover, the operation of the pump 32 can be controlled to enable it to operate periodically, such that the pump can operate efficiently at a decreased average pump flow rate. This obviates the need to replace the electric submersible pump with another pump, such as a rod beam pump, when fluid level or inflow within the well decreases over time.

Further, in accordance with the invention, the pump can be cycled between its most efficient operating speed and zero speed at a variable duty cycle to regulate average pump flow rate. Referring to FIG. 1, in cases where electric submersible pumps are being operated at a low duty cycle, such as on for twenty-five percent of the time and off for seventy-five percent of the time, a check valve 28 may be used down hole to prevent back flow of previously pumped fluid during the portion of each cycle that the pump is off. The check valve 28 can be designed to allow a small amount of leakage. This allows the fluid to slowly drain out of the tube 38 to allow maintenance operations.

Pump Model

Figure 5:
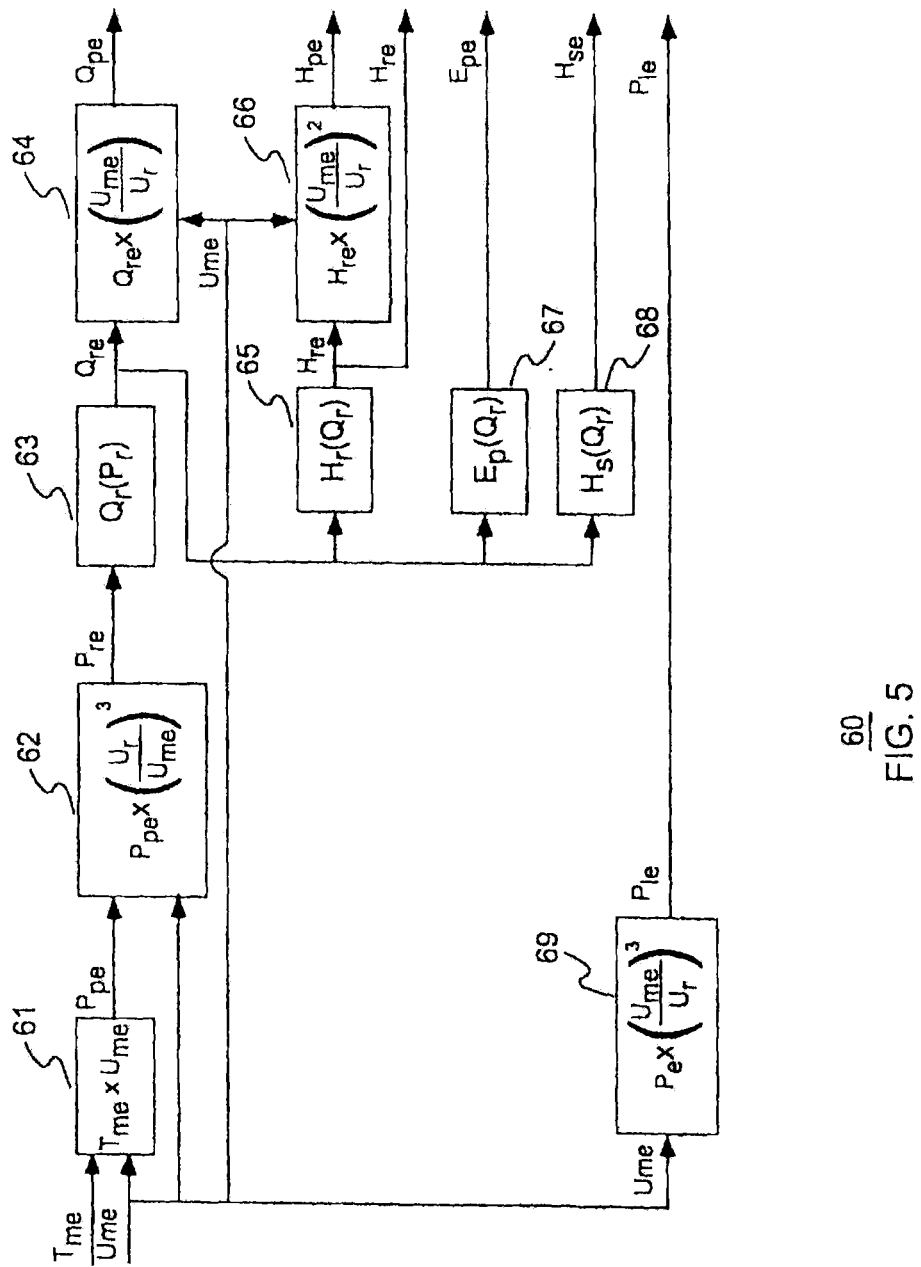
FIG. 5 is a block diagram of an algorithm for a pump model of the centrifugal pump control system of FIG. 3.

Reference is now made to FIG. 5, which is a block diagram of an algorithm for the pump model 60 of the pump 32 as used in the embodiment shown in FIG. 3 where it is possible to calculate an estimate of pump flow rate. The pump model 60 is used to calculate estimates of parameters including head pressure Hpe, fluid flow Qpe, minimum required suction head pressure Hse, pump mechanical input power limit Ple, and pump efficiency Epe. In one preferred embodiment, the calculations are carried out by the processing unit 54 (FIG. 2) under the control of software routines stored in the storage devices 55 (FIG. 2). Briefly, values of motor torque Tme and motor speed Ume are used to calculate the mechanical power input to the pump Ppe which is used with the motor speed value Ume to calculate what the flow Qre would be at rated pump speed Ur. This value of Qre is used with formulas derived from published pump data and pump affinity laws to solve for the pump head at rated speed Hre, pump efficiency Epe, and minimum required suction head pressure required Hse. Using the value of motor speed Ume, the values of pump head at rated speed Hre and pump flow rate at rated speed Qre are scaled using pump affinity laws to estimated values of pump head Hpe and pump flow rate Qpe, respectively.

With reference to the algorithm illustrated in FIG. 5, the value for pump mechanical input power Ppe is obtained by multiplying the value for motor torque Tme by the value of motor speed Ume in Block 61. In Block 62, the mechanical input power applied to the pump, Ppe is multiplied by a scaling factor calculated as the cube of the ratio of the rated speed of the pump Ur to the current speed Ume to yield a value representing the power Pre which the pump would require at rated pump speedUr. This scaling factor is derived from affinity laws for centrifugal pumps.

Block 63 derives a value of the pump flow rate Qre at the rated speed with the current conditions. This value of pump flow rate Qre at rated speed is calculated as a function of power Pre at rated speedUr. Pump manufacturers often provide pump curves such as the one shown in FIG. 13, which relates pump mechanical input power Pp to flow Qre at rated speed. Alternatively, such a curve can be generated from values of pump head as a function of flow at rated speed, pump efficiency as a function of flow at rated speed, and the fluid density. The function of Block 63 (FIG. 5) is derived from the data contained in the graph. One of two methods is used to derive the function of Block 63 from the data in this graph. The first method is to select data points and use curve fitting techniques, which are known, to generate an equation describing power as a function of flow. Solving the equation so flow is given as a function of power will provide one method of performing the calculation in Block 63. One simple method is to fit the data to a second order equation. In the case of a second order equation, the solution for flow is in the form of a quadratic equation which yields two solutions of flow for each value of power. In this case, Block 63 must contain a means of selecting flow value Qre from the two solutions. This is usually easy as one of the values will be much less likely than the other, if not impossible as in a negative flow solution. The second method is to select several points on the graph to produce a look-up table of flow versus power. With such a look-up table, it is relatively easy to use linear interpolation to determine values of Qre between data points.

In Block 64, the value for flow at rated speed, Qre, is scaled by the ratio of the current speed Ume to the rated speed Ur to yield the pump flow rate value Qpe. This scaling factor is derived from affinity laws for centrifugal pumps.

Figure 11:
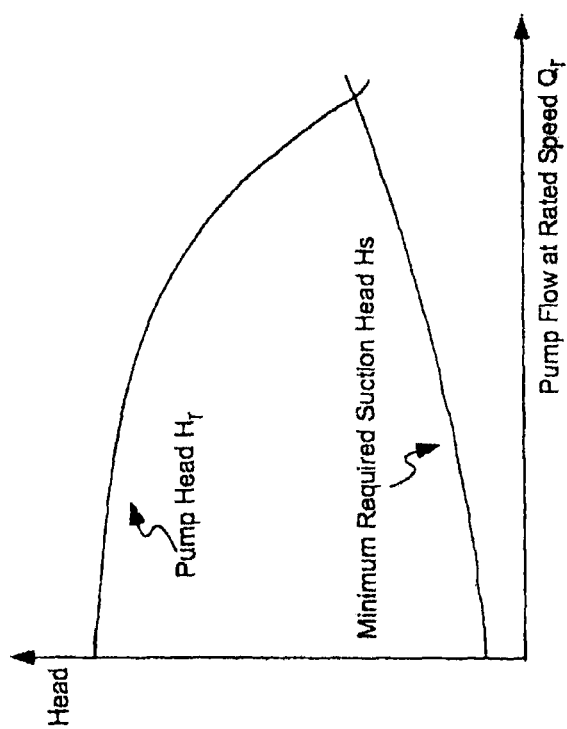
FIGS. 11 through 13 are a set of pump specification curves for a centrifugal pump, illustrating pump power, pump head, pump efficiency and pump suction pressure required wherein each is a function of pump flow rate at rated speed.

Block 65 calculates a value of head pressure at rated speed Hre as a function of flow at rated speed Qre. Pump manufacturers provide pump curves such as the one shown in FIG. 11, which relates pump head pressure to flow at rated speed. The function of Block 65 is uses the data contained in the graph. One of two methods is used to derive the function of Block 65 from the data in this graph. The first method is to select data points and use curve fitting techniques, which are known, to generate an equation describing pump head pressure as a function of flow. The second method is to select several points on the graph to produce a look-up table of pump head pressure versus flow. With such a look-up table, it is relatively easy to use linear interpolation to determine values of Hre between data points. In Block 66, the value for pump head pressure at rated speed, Hre, is scaled by the square of ratio of the current speed Ume to the rated speed Ur to yield the pump head pressure value Hpe. This scaling factor is derived from affinity laws for centrifugal pumps.

Figure 12:
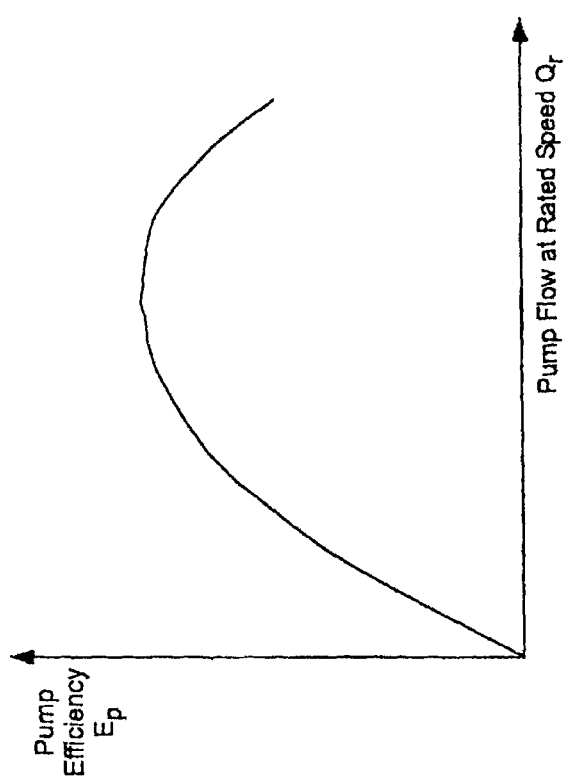

The efficiency of the pump is calculated in Block 67 to yield the value Epe. Pump efficiency is the ratio of fluid power output divided by mechanical power input. Pump manufacturers provide pump curves such as the one shown in FIG. 12, which relates pump efficiency to pump flow rate at rated speed. The function of Block 67 is derived from the data contained in the graph. One of two methods is used to derive the function of Block 67 from the data in this graph. The first method is to select data points and use curve fitting techniques, which are known, to generate an equation describing pump efficiency as a function of flow. The second method is to select several points on the graph to produce a look-up table of pump efficiency versus flow. With such a look-up table, it is relatively easy to use linear interpolation to determine values of Epe between data points.

An estimate of the suction head pressure required at the input of the pump, Hse, is calculated in Block 68. Pump manufacturers provide pump curves such as the one shown in FIG. 11, which relates the pump's minimum required suction head pressure Hs to pump flow rate at rated speed. The function of Block 68 is derived from the data contained in the graph. One of two methods is used to derive the function of Block 68 from the data in this graph. The first method is to select data points and use curve fitting techniques, which are known, to generate an equation describing pump suction pressure required as a function of flow. The second method is to select several points on the graph to produce a look-up table of pump suction pressure required versus pump flow rate. With such a look-up table, it is relatively easy to use linear interpolation to determine values of Sre between data points.

A mechanical input power limit for the pump is calculated in Block 69. The end of curve power level Pe as shown in FIG. 13 is scaled by the cube of the ratio of the current speed Ume to the rated speed Ur to provide the mechanical input power limit estimate Ple. This scaling factor is derived from affinity laws for centrifugal pumps. The mechanical input power limit value can be used to limit the torque and/or the speed of the pump, and thereby limit power, to levels which will not damage the pump.

Figure 6:
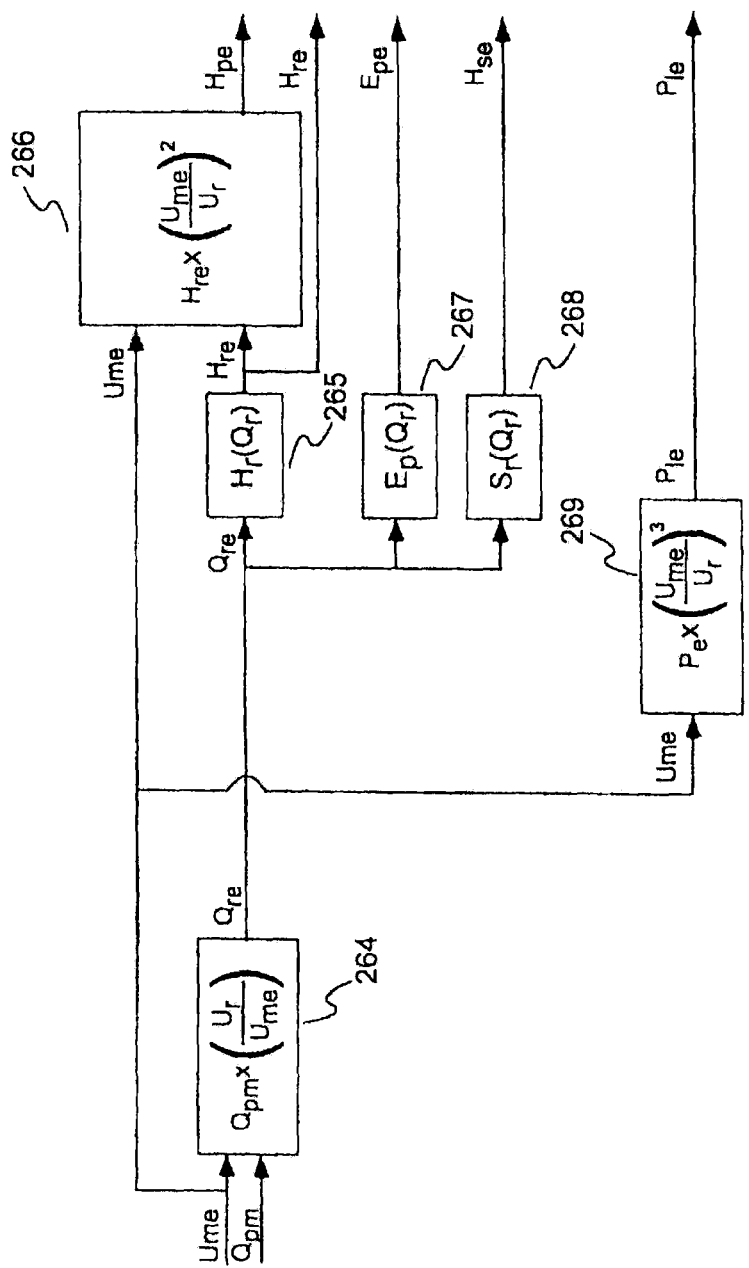
FIG. 6 is a block diagram of an algorithm for a pump model of the centrifugal pump control system of FIG. 4.

Reference is now made to FIG. 6, which is a block diagram of an algorithm for the pump model 260 of the pump 32 as used in the embodiment shown in FIG. 4 where it is not possible to calculate an estimate of pump flow rate. The pump model 260 is used to calculate estimates of parameters including head pressure Hpe, minimum required suction head pressure Hse, pump mechanical input power limit Ple, and pump efficiency Epe. In one preferred embodiment, the calculations are carried out by the processing unit 54 (FIG. 2) under the control of software routines stored in the storage devices 55 (FIG. 2). Briefly, values of measured fluid flow Qpm and motor speed Ume are used to calculate what the flow Qre would be at rated pump speed Ur. This value of flow Qre is used with formulas derived from published pump data and pump affinity laws to solve for the pump head at rated speed Hre, pump efficiency Epe, and minimum required suction head pressure required Hse. Using the value of motor speed Ume, the values of pump head at rated speed Hre and pump flow rate at rated speed Qre are scaled using pump affinity laws to estimated values of pump head Hpe and pump flow rate Qpe respectively.

With reference to the algorithm illustrated in FIG. 6, in Block 264, the value for measured pump flow rate Qpm is scaled by the ratio of the rated speed of the pump Ur to the speed of the pump Ume to derive an estimate of the flow of the pump at rated speed Qre. This scaling factor is derived from affinity laws for centrifugal pumps.

Block 265 calculates a value of head pressure at rated speed Hre as a function of flow Qre at rated speed Ur. Pump manufacturers provide pump curves such as the one shown in FIG. 11, which relates pump head pressure to flow at rated speed. The function of Block 265 is derived from the data contained in the graph. One of two methods is used to derive the function of Block 265 from the data in this graph. The first method is to select data points and use curve fitting techniques, which are known, to generate an equation describing pump head pressure as a function of flow. The second method is to select several points on the graph to produce a look-up table of pump head pressure versus flow. With such a look-up table, it is relatively easy to use linear interpolation to determine values of Hre between data points. In Block 266, the value for pump head pressure at rated speed, Hre, is scaled by the square of the ratio of the current speed Ume to the rated speed Ur to yield the pump head pressure value Hpe. This scaling factor is derived from affinity laws for centrifugal pumps.

The efficiency of the pump is calculated in Block 267 to yield the value Epe. Pump efficiency is the ratio of fluid power output divided by mechanical power input. Pump manufacturers provide pump curves such as the one shown in FIG. 12, which relates pump efficiency to pump flow rate at rated speed. The function of Block 267 is derived from the data contained in the graph. One of two methods is used to derive the function of Block 267 from the data in this graph. The first method is to select data points and use curve fitting techniques, which are known, to generate an equation describing pump efficiency as a function of flow. The second method is to select several points on the graph to produce a look-up table of pump efficiency versus flow. With such a look-up table, it is relatively easy to use linear interpolation to determine values of Epe between data points.

An estimate of the suction head pressure required at the input of the pump, Hse, is calculated in Block 268. Pump manufacturers provide pump curves such as the one shown in FIG. 11, which relates the pump's minimum required suction head pressure Hs to pump flow rate at rated speed. The function of Block 268 is derived from the data contained in the graph. One of two methods is used to derive the function of Block 68 from the data in this graph. The first method is to select data points and use curve fitting techniques, which are known, to generate an equation describing pump suction pressure required as a function of flow. The second method is to select several points on the graph to produce a look-up table of pump suction pressure required versus pump flow rate. With such a look-up table, it is relatively easy to use linear interpolation to determine values of Sre between data points.

A mechanical input power limit for the pump is calculated in Block 269. The end of curve power level Pe as shown in FIG. 13 is scaled by the cube of the ratio of the current speed Ume to the rated speed Ur to provide the mechanical input power limit estimate Ple. This scaling factor is derived from affinity laws for centrifugal pumps. The mechanical input power limit value Ple can be used to limit the torque and/or the speed of the pump, and thereby limit power, to levels which will not damage the pump.

System Model

Figure 7:
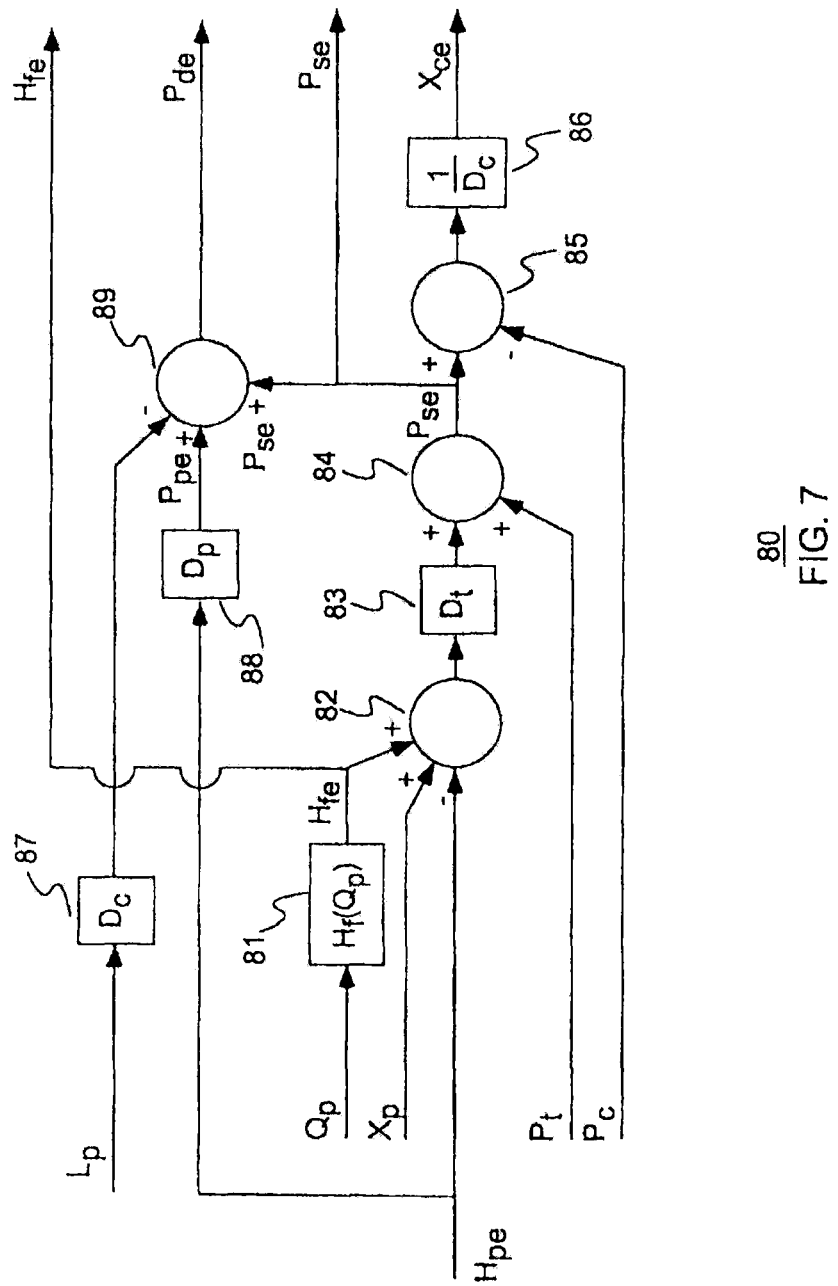
FIG. 7 is a block diagram of an algorithm for a system model of the centrifugal pump control system of FIGS. 3 and 4.
Figure 14:
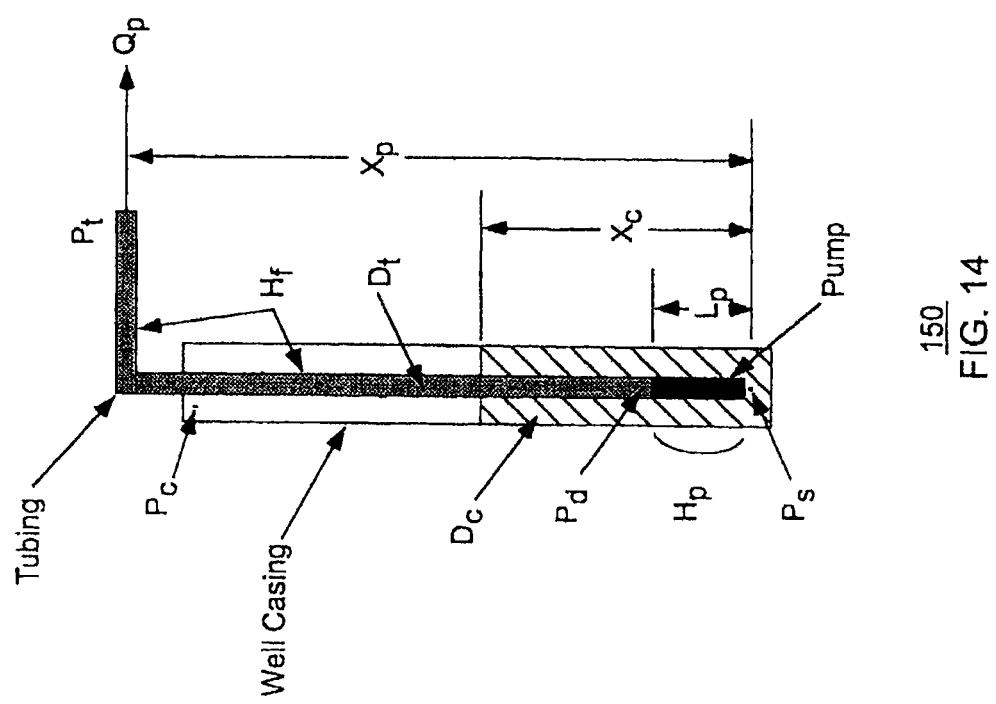
FIG. 14 is a diagram of a typical installation of a centrifugal pump, illustrating the relationship between the pumping system parameters.

Reference is now made to FIG. 7, which is a block diagram of an algorithm for the system model 80 of the fluid system 150. The system model 80 is used to calculate estimates of system parameters including pump suction pressure Pse, pump discharge pressure Pde, head flow loss Hfe and casing fluid level Xce. In one preferred embodiment, the calculations are carried out by the processing unit 54 (FIG. 2) under the control of software routines stored in the storage devices 55. FIG. 14 diagrammatically presents the actual reservoir system parameters used in FIG. 5 for the pump 32. Ps is the pump suction pressure, Pd is the pump discharge pressure, Hp is the pump head pressure, Hf is the flow head loss and Qp is the pump flow rate. Lp is the length of the pump, Lt (not shown) is the length of the tubing from the pump outlet to the tubing outlet, Xp is the pump depth and Xc is the fluid level within the casing 39 (FIG. 1). Pc is the pressure within the casing and Pt is the pressure within the tubing 38. Parameter Dt is the tubing fluid specific weight, parameter Dc is the casing fluid specific weight, and parameter Dp (not shown) is the specific weight of the fluid within the pump.

Briefly, with reference to FIG. 7, a value representing pump flow rate Qp (such as measured surface flow rate Qpm or estimated pump flow rate Qpe), pump head pressure estimate Hpe, and values of tubing pressure Pt and casing pressure Pc are combined with reservoir parameters of pump depth Xp and pump length Lp to determine pump suction pressure Pse and casing fluid level Xce.

More specifically, the processing unit 54 responds to the value representing pump flow rate Qp. This value representing pump flow rate Qp can be either the value of Qpe produced by the pump model 60, as shown in FIG. 3, or the value of Qpm as shown in FIG. 4 from a surface flow sensor 59 (FIG. 2). This pump flow rate value is used to calculate a tubing flow head loss estimate Hfe in Block 81. The head loss equation for Hfe presented in Block 81 can be derived empirically and fit to an appropriate equation or obtained from well known relationships for incompressible flow. One such relationship for flow head loss estimate Hfe is obtained from the Darcy-Weisbach equation:

$$Hfe = f[(L/d)(V^2/2G)] \quad (1)$$

where f is the friction factor, L is the length of the tubing, d is the inner diameter of the tubing, V is the average fluid velocity (Q/A, where Q is the fluid flow and A is the area of the tubing), and G is the gravitational constant. For laminar flow conditions (Re<2300), the friction factor f is equal to 64/Re, where Re is the Reynolds number. For turbulent flow conditions, the friction factor can be obtained using the Moody equation and a modified Colebrook equation, which will be known to one of ordinary skill in the art. For non-circular pipes, the hydraulic radius (diameter) equivalent may be used in place of the diameter in equation (1). Furthermore, in situ calibration may be employed to extract values for the friction factor f in equation (1) by system identification algorithms. Commercial programs that account for detailed hydraulic losses within the tubing are also available for calculation of fluid flow loss factors.

It should be noted that although fluid velocity V may change throughout the tubing length, the value for fluid velocity can be assumed to be constant over a given range.

The suction pressure Pse is calculated by adding the head loss Hfe calculated in Block 81 with the pump depth Xp and subtracting the pump head pressure Hpe in summing Block 82. The output of summing block 82 is scaled by the tubing fluid specific weight Dt in Block 83 and added to the value representing tubing pressure Pt in summing Block 84 to yield the suction pressure Pse.

The pump discharge pressure Pde is calculated by scaling the length of the pump Lp by the casing fluid specific weight Dc in Block 87. The pump head pressure Hpe is then scaled by the pump fluid specific weight Dp in block 88 to yield the differential pressure across the pump, Ppe. Pump pressure Ppe is then added to the pump suction pressure Pse and the negative of the output of scaling Block 87 in summing Block 89 to calculate the pump discharge pressure Pde.

The casing fluid level Xce is calculated by subtracting casing pressure Pc from the suction pressure Pse, calculated in summing Block 84, in summing Block 85. The result of summing Block 85 is scaled by the reciprocal of the casing fluid specific weight Dc in Block 86 to yield the casing fluid level Xce.

The casing fluid specific weight Dc, pump fluid specific weight Dp, and tubing fluid specific weight Dt may differ due to different amounts and properties of dissolved gases in the fluid. At reduced pressures, dissolved gases may bubble out of the fluid and affect the fluid density. Numerous methods are available for calculation of average fluid density as a function of fluid and gas properties which are known in the art.

Wellbore Fluid Level Determination

In addition to the various approaches to determining fluid level Xc described above, the present invention can be utilized for determining fluid level Xc, in a manner which does not require the optional surface flow sensor 59, shown in FIG. 2. As will be described in more detail below, the present invention may be used for determining the fluid level Xc in the wellbore 39, by determining a zero-flow input speed Uz to the centrifugal pump 32 at which output flow from the centrifugal pump 32 becomes substantially zero, and using the zero-flow input speed Uz to calculate the fluid level Xc in the wellbore. Where an apparatus, according to the invention, such as in the exemplary embodiment of the pump control system 20 shown in FIG. 2, has a centrifugal pump 32 driven by an electric motor 36, determining the zero-flow input speed Uz of the centrifugal pump 32 can be accomplished in a relatively straightforward manner utilizing current and voltage sensors 51, 52, located above ground level, so that no down-hole sensors need to be provided.

In various embodiments of this aspect of the invention, those having skill in the art will recognize that the variables utilized in a given embodiment may be measured or estimated, or some combination of measured and estimated variables may be used. Accordingly, for ease of understanding, the subscripts "m" and "e" are intentionally omitted from the description of aspects of the invention utilizing a variable corresponding to a zero-flow condition, with the intention that those skilled in the art will recognize that either an estimated or a measured value of the variable may be used, dependent upon the specific needs of a given embodiment. As a result, regardless of whether a particular variable is measured or estimated, in practicing the invention, variables having a second subscript of "z," indicate that the variable applies at a zero-flow condition of the pump, as in Hpz for head pressure developed by the pump at a zero flow condition, corresponding to a zero-flow speed Upz, whereat the pump speed Up has been reduced to a point where flow from the pump is substantially zero.

Figure 17:
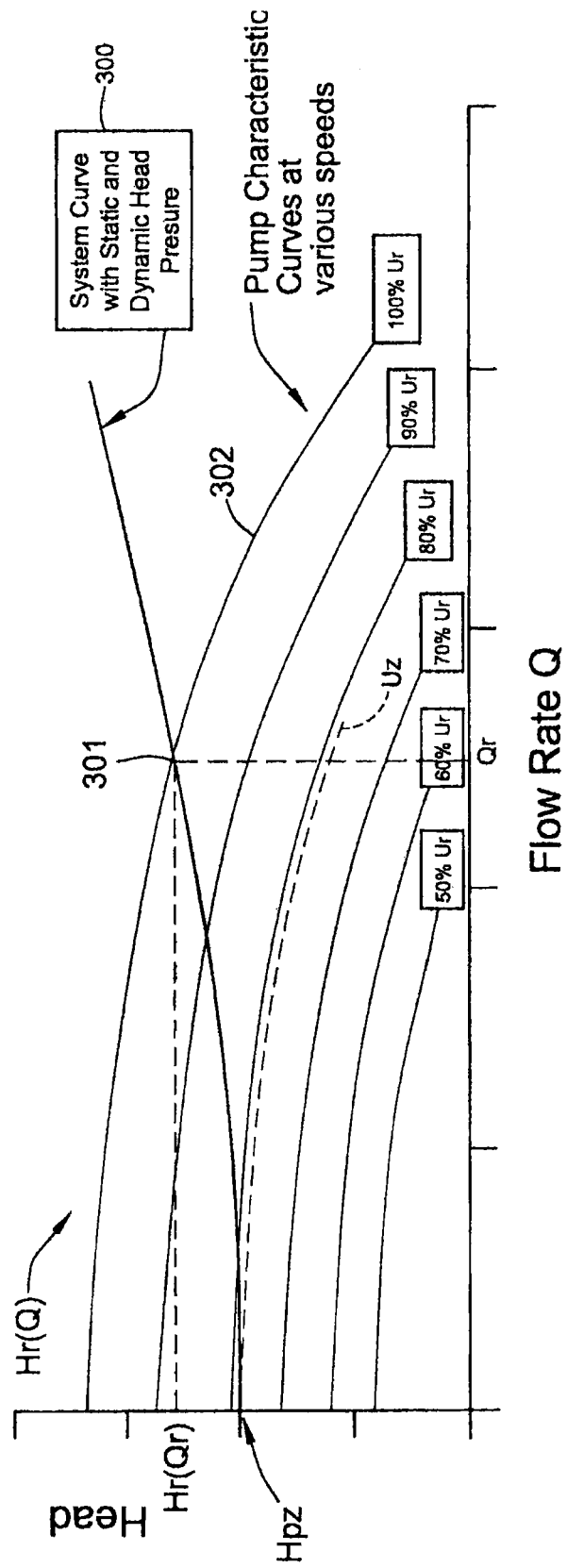
FIG. 17 is a graphical illustration of pump characteristic curves, illustrating operation at various speeds for a centrifugal pump of a type which may be used in practicing the invention, having superimposed thereupon a representative system characteristic curve for a system having both static and dynamic head.

In practicing this aspect of the invention, the inventors have noted and made advantageous use of the fact that pump head pressure Hp at zero flow of the centrifugal pump 32 follows the affinity scaling law $Hpz = Hr\,(Qp=0)(Upz/Ur)^n$, where n is a value substantially in the range of 1.5 to 2.5. For example, as illustrated in FIG. 17, for a pump operating at various percentages of its operating speed Ur, in a system 300 having static and dynamic head, the affinity scaling law will accurately predict that the pump will reach a point of zero flow (Qpz), where the flow differential pressure (Hpz) equals the static head. As illustrated in FIG. 17, the presence of static head in the system causes the zero-flow head pressure Hpz to occur at a percentage of rated speed Ur that is substantially higher than zero. The inventors recognized that this phenomenon can be utilized for determining the level of fluid Xc in the casing 39.

Specifically, the inventors recognized that in systems such as, but not limited to, submersible pumps in oil, water, or gas production, irrigation systems, waste water systems, or various types of municipal water systems, once the zero-flow differential pressure Hpz across the centrifugal pump 32 is known, remaining variables necessary to calculate the fluid level Xc in the casing 39 are largely a function of geometry, fluid density, or other properties which are either known or relatively easily determinable from information available above the surface of the ground, or the top of a wellbore, well casing, tank, reservoir, etc., in which the centrifugal pump is operating.

Figure 18:
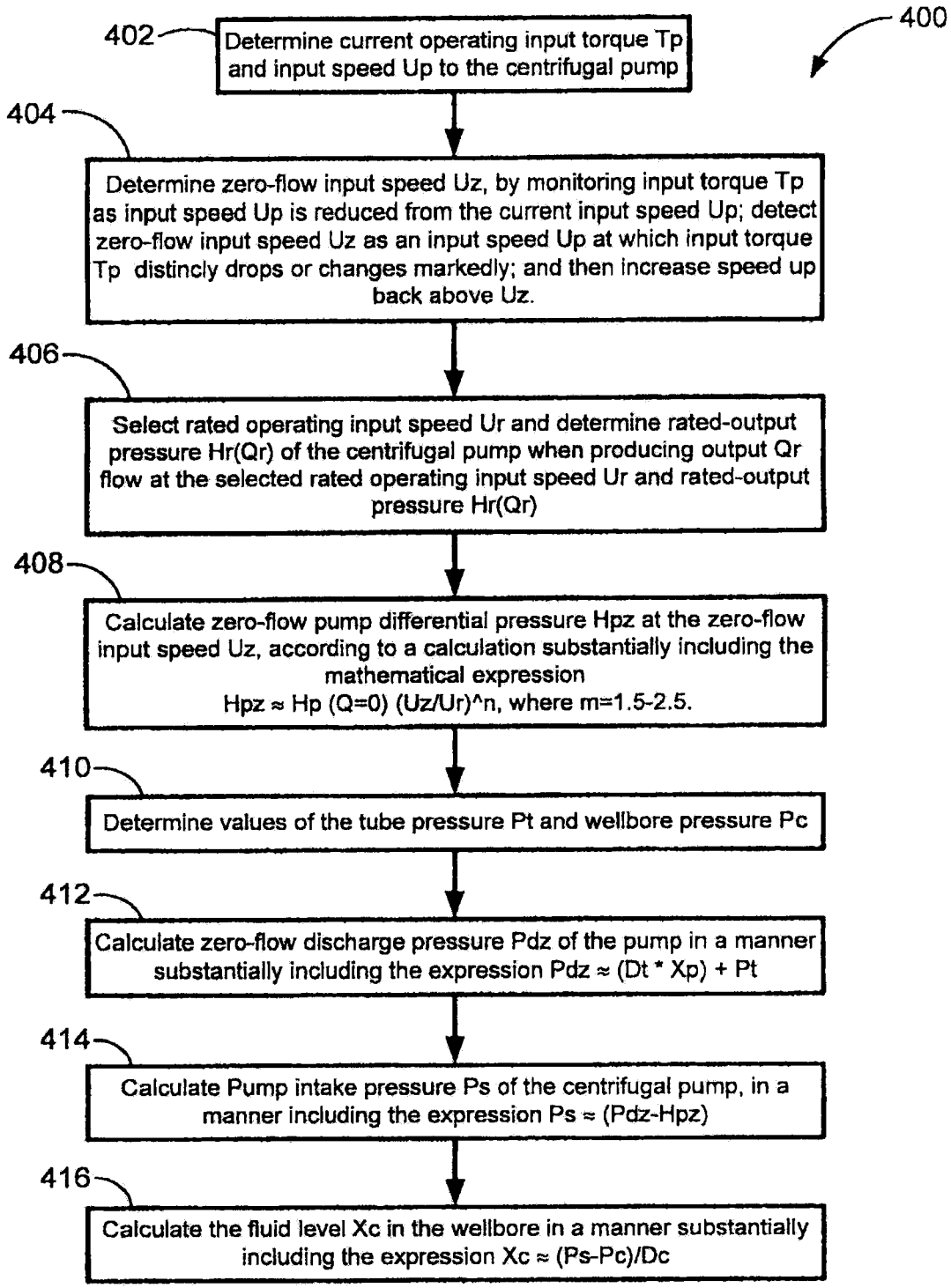
FIG. 18 is a block diagram of an exemplary embodiment of a method, according to the invention, for determining a fluid level in a wellbore.

With reference to the fluid level system 150 shown in FIG. 14, an exemplary embodiment of a method 400, according to the invention, for determining a fluid level Xc in the wellbore 39 is illustrated by the block diagram shown in FIG. 18. For purposes of clarity of explanation, because values of variables such as pump torque Tp, pump speed Up, pump head Hp, pump flow Qp, and other variables, may alternatively be measured or estimated, in various embodiments of the invention, the subscripts "m" and "e" will not be used in describing the exemplary embodiment of the method 400. In similar fashion, although those having skill in the art will recognize that the values of various variables and parameters referenced in the exemplary embodiment of the method 400 can be used as feedback or control signals, the subscripts "f" and "c" will not be used in the description of the method 400.

As shown at Block 402 of FIG. 18, current operating values of input torque Tp and input speed Up of the centrifugal pump 32 are determined by an appropriate manner, such as, for example, by direct measurement with speed and torque sensors, or through the use of voltage and current sensors 51, 52 for monitoring an electrical signal being applied to an electric motor 36 in the embodiment of the pump control system 20 shown in FIG. 2, and calculating input speed Up and torque Tp, by methods disclosed elsewhere herein, or by any other appropriate method.

As shown in Block 404, of FIG. 18, once the current operating input speed Ur of the centrifugal pump 32 is selected, a zero-flow input speed Uz of the centrifugal pump 32 is then determined, without using output flow Qp from the centrifugal pump 32, by monitoring input torque Tp to the centrifugal pump 32 as the input speed Up is reduced from the current operating input speed Ur, and detecting the zero-flow input speed Uz to have occurred substantially at or near an input speed Uz at which a further incremental reduction in input speed U is accompanied by a distinct drop or other marked change in input torque Tp. When performing this step of a method, according to the invention, the zero-flow input speed Uz, may be detected in any appropriate manner including detecting when dT/dU reaches maximum, and/or drops below a pre-defined threshold which may be zero or another value appropriate and convenient for use in a particular embodiment of the invention.

Figure 19:
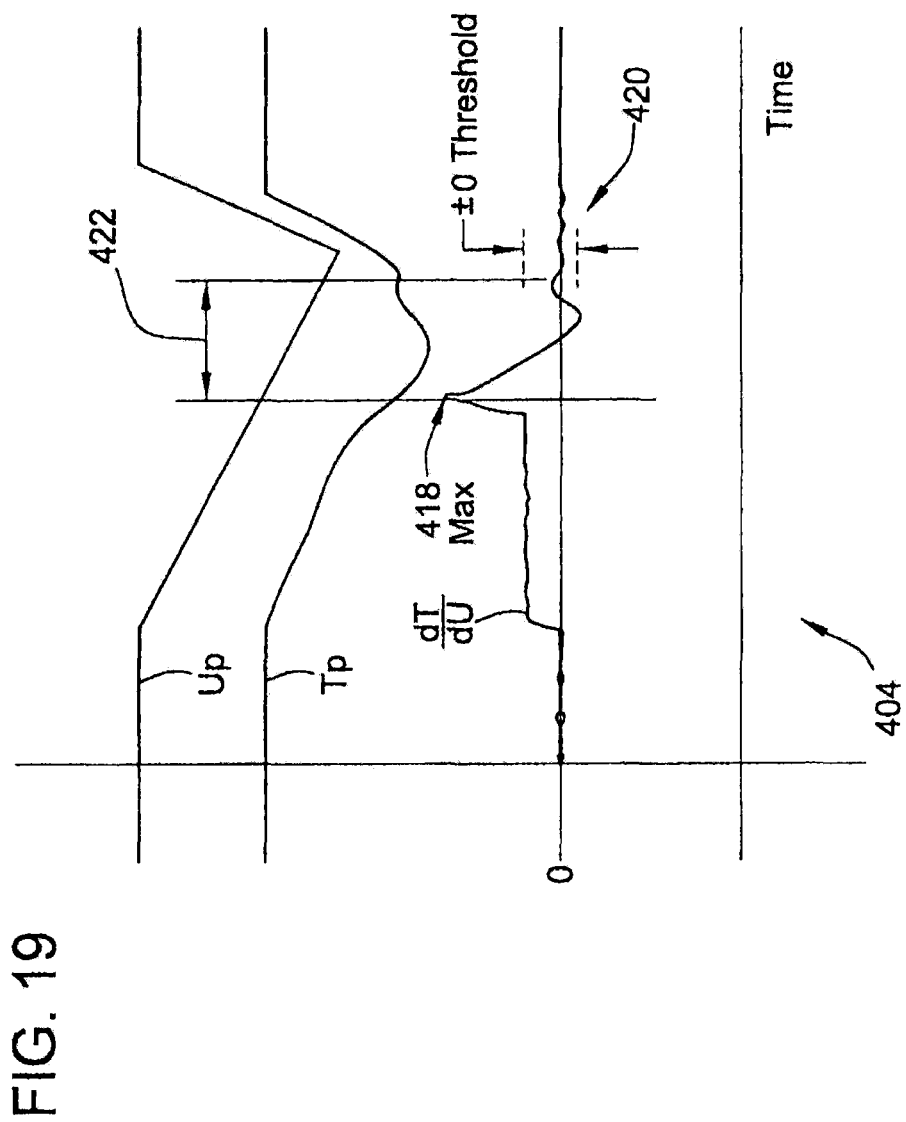
FIG. 19 is a graphical illustration showing details of an exemplary embodiment for performing a step of determining zero-flow input speed, as shown in Block 406 of FIG. 18.

As shown in FIG. 19, for example, as pump speed Up is reduced from the current operating input speed Up, the pump input torque Tp will also trend generally downward, in a corresponding manner with pump speed Up, until a speed Uz is reached at which the pump stops producing flow, and at which a further reduction in input speed Up is accompanied by a divergence in the form of a distinct drop or other marked change in torque Tp.

As indicated in the graph of dT/dU in FIG. 19, when the point of divergence between the change in speed Up and torque Tp is reached, flow Qp becomes somewhat unstable, and may actually become negative, which sometimes results in the value of dT/dU reaching a detectable maximum value 418 of dT/dU, and then trending back toward a minimum or zero value of dT/dU, as indicated at 420 in FIG. 19. In various embodiments of the invention, the zero-flow speed Uz may be determined to be the input speed Up at the maximum value 418 of dT/dU, a speed Up at which the value of dT/dU has dropped back inside of a selected threshold value substantially equal to the point at which dT/dU returns to approximately zero, as shown at 420 in FIG. 19, or another appropriate point over a range 422 between the maximum value 418 of dT/dU and the substantially zero value of dT/dU, as shown at 420 in FIG. 19.

As shown in Block 406 of FIG. 18, a rated-operating input speed Ur of the centrifugal pump 32 is then selected, and a rated differential pressure Hr(Qr) from the inlet to the outlet of the centrifugal pump 32 is determined, with the centrifugal pump 32 producing a rated output flow (Qr) at the rated-operating input speed Ur and rated-pressure Hr(Qr). Those having skill in the art will recognize that the parameters Hr(Qr) and output flow Qr of the centrifugal pump 32 at the rated operating speed Ur will be defined, as illustrated in FIG. 17, by the intersection 301 of the pump characteristic curve 302 of the centrifugal pump 32 (i.e. the Hr(Q) vs. Q curve for the pump operating at 100% of the selected value of rated speed Ur) and the system curve 300 for the oil well 30.

As shown in Block 408 of FIG. 18, once the zero-flow input speed Uz is known, a zero-flow pump differential pressure Hpz, across the pump 32, at the zero-flow input speed Uz is calculated, using an affinity law, by multiplying the rated output pressure Hr by a power of the quotient of the zero-flow input speed Uz divided by the rated input speed Ur, according to a calculation substantially including the mathematical expression Hpz≈Hr (Q=0) (Uz/Ur)^n, where n may be any appropriate value in the range of 1.5 to 2.5, with a value of 2 being used in the exemplary embodiment of the method 400.

As shown in Block 410, of FIG. 18, values of tube-pressure Pt and wellbore pressure Pc are then determined, through use of pressure sensors of any appropriate type known in the art, and the zero-flow discharge pressure Pdz of the pump 32 is calculated in a manner substantially including the expression Pdz≈(Dt*Xp)+Pt, as shown in Block 412 of FIG. 18. It will be noted that, in performing this step of the exemplary embodiment of the method 400, for the pump 32 of a length of about 30 feet or less positioned at the bottom of a wellbore 39 of several thousand feet in depth, the length of the pump Lp and the specific weight Dt of the fluid therein is ignored as having a diminimus effect on calculation of the zero-flow discharge pressure Pdz. In other embodiments, where it may be desirable to include the effect of pump length, the value of zero-flow discharge pressure may be calculated in a manner substantially including the expression: Pdz≈Dt*(Xp−Lp)+Pt.

As shown in Block 414, of FIG. 18, the pump intake (suction) head pressure Ps of the centrifugal pump 32 is then calculated in a manner including the expression Ps≈Pdz−Hpz.

As shown in Block 416, of FIG. 18, the fluid level Xc in the wellbore 39 is then calculated in a manner substantially including the expression Xc≈(Ps−Pc)/Dc.

Once the fluid level Xc has been calculated for the wellbore, in the manner described above, in accordance with the exemplary method 400 shown in FIG. 18, those having skill in the art will recognize that the calculated fluid level Xc in the wellbore 39 may be utilized for other purposes, in accordance with the invention, such as controlling the centrifugal pump 32, or for controlling the fluid level Xc in the wellbore 39. Even where the invention is utilized solely for determining the fluid level Xc, those skilled in the art will recognize that the invention provides significant advantages over prior methods and apparatuses for determining fluid level Xc.

It should be noted, that calculations performed in the various steps of the exemplary embodiment 400 of the invention, described above, have been shown as being substantial equalities, in recognition of the fact that, in certain embodiments of the invention, it may be desirable to add additional terms or constants to the basic exemplary equations shown in FIG. 18. It is further noted, however, that, in some embodiments, the invention may be practiced with one or more of the calculations in the various steps of the method 400 being true, or assumed, equalities, without any additional terms or constants.

It will also be recognized, by those having skill in the art, that the aspect of the invention described in this section, for determining a fluid level Xc of a wellbore, tank, etc., as a function of the input speed Up and input torque Tp of the centrifugal pump may also be practiced in other forms, such as an apparatus, or a computer program, according to the invention.

It will be further noted, that due to the highly unstable nature of the fluid flow within the pump at speeds in the region of the zero-flow speed Uz, some embodiments of the invention may further include provisions for offsetting the determined value of zero-flow speed Uz, or the determined value of fluid level Xc, to improve accuracy of the determined fluid level, on the basis of other more direct measurements of fluid level taken by more conventional methods, such as acoustic or light reflection or soundings. Stated another way, experience has shown that determining fluid level, according to the invention, provides a highly repeatable and reliable method for precisely determining the fluid level Xc, within a degree of accuracy that is completely acceptable for many applications of the invention. In applications of the invention where increased accuracy is required, it may be desirable to determine and incorporate an appropriate offset into determination of the fluid level Xc, through comparison of the value of Xc determined according to the method described above with a verification measurement made by traditional methods. Once the appropriate offset is determined and included a method or apparatus, according to the invention, the method of the invention can be relied upon for providing highly reliable, repeatable, precise and accurate determinations of the fluid level Xc.

Fluid Level Feedforward Controller

Figure 9:
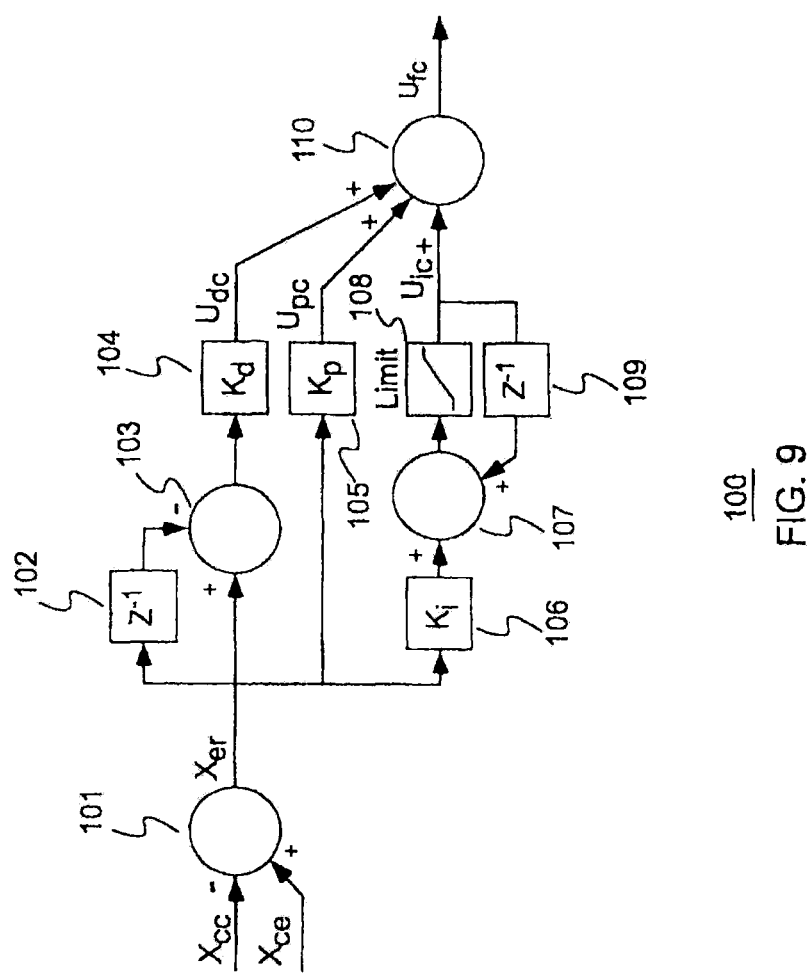
FIG. 9 is a block diagram of an algorithm for a fluid level feedback controller of the centrifugal pump control system of FIGS. 3 and 4.

Referring to FIG. 8, there is shown a process diagram of the fluid level feedforward controller 90. The fluid level feedforward controller 90 uses flow head loss Hfe, pump head pressure Hre at rated speed and other parameters to produce a motor speed feedforward command Muff to be summed with the motor speed feedback command Fuci in summing Block 79 (FIG. 3 and FIG. 4) to produce the motor speed command Much for the motor vector controller 130. This speed signal is based on predicting the pump speed required to maintain desired pressures, flows and levels in the pumping system. Use of this controller reduces the amount of fluid level error in the fluid level feedback controller 100 (FIG. 9), allowing conservative controller tuning and faster closed loop system response.

More specifically, in scaling Block 91, the value of casing pressure Pc is scaled by the inverse of the casing fluid specific weight Dc to express the result in equivalent column height (head) of casing fluid. Similarly, in scaling Block 92, the value of tubing pressure Pt is scaled by the inverse of the tubing fluid specific weight Dt to express the result in equivalent column height (head) of tubing fluid. In summing Block 93, the negative of the output of Block 91 is added to the output of Block 92, the pipe head flow loss Hfe, the depth of the pump Xp, and the negative of the commanded casing fluid level X-C to obtain pump head pressure command Hip. The flow head loss Hfe is the reduction in pressure due to fluid friction as calculated in Block 81 (FIG. 7). The commanded pump head Hip is the pressure that the pump must produce as a result of the inputs to summing Block 93. The values of casing pressure Pc and tubing pressure Pt can be measured in real time using above ground sensors in systems where they are variable or fixed for systems where they are relatively constant. The values of pump depth Xp and commanded casing fluid level command X-C are known.

More specifically, in Block 94, the pump speed required to produce the pressure required by the head pressure command Hip is calculated by multiplying the rated speed Ur by the square root of the ratio of the head pressure command Hip to the head pressure at rated speed Hre to yield the motor speed feedforward command Umf. The value of head pressure at rated speed Hre is calculated by Block 65 of FIG. 5 or Block 265 of FIG. 6 depending on the specific embodiment Fluid Level Feedback Controller Reference is now made to FIG. 9, which is a block diagram of a fluid level feedback controller 100 for the motor vector controller 130. The fluid level feedback controller 100 includes a PID (proportional, integral, derivative) function that responds to errors between casing fluid level command Xcc and casing fluid level Xce to adjust the speed command for the pump 32. Operation of the fluid level feedforward controller 90 provides a command based on the projected operation of the system. This assures that the errors to which the fluid level feedback controller 100 must respond will only be the result of disturbances to the system.

The inputs to the fluid level feedback controller 100 include casing fluid level command Xcc and a casing fluid level value Xce. The fluid level command Xcc is a known value and is subtracted from the casing fluid level value Xce in Block 101 to produce the error signal Xer for the fluid level feedback controller 100.

The algorithm of the fluid level feedback controller 100 uses Z-transformations to obtain values for the discrete PID controller. The term Z−1 (Blocks 102 and 109) means that the value from the previous iteration is used during the current iteration.

More specifically, in summing Block 101, an error signal Xer is produced by subtracting Xcc from Xce. The speed command derivative error term Udc is calculated by subtracting, in summing Block 103, the current Xer value obtained in Block 101 from the previous Xer term obtained from Block 102 and multiplying by the derivative gain Kd in Block 104. The speed command proportional error term Upc is calculated by multiplying the proportional gain Kp in Block 105 by the current Xer value obtained in Block 101. The speed command integral error term Uic is calculated by multiplying the integral gain Ki in Block 106 by the current Xer value obtained in Block 101 and summing this value in Block 107 with the previous value of Uic obtained from Block 109. The output of summing Block 107 is passed through an output limiter, Block 108, to produce the current integral error term Uic. The three error terms, Udc, Upc and Uic, are combined in summing Block 110 to produce the speed command Ufc to be summed with the motor speed feedforward command Umf in summing Block 79 (FIG. 3 and FIG. 4) for the motor vector controller 130.

Determining Pump Flow Rate without Using Motor Torque

Figure 20:
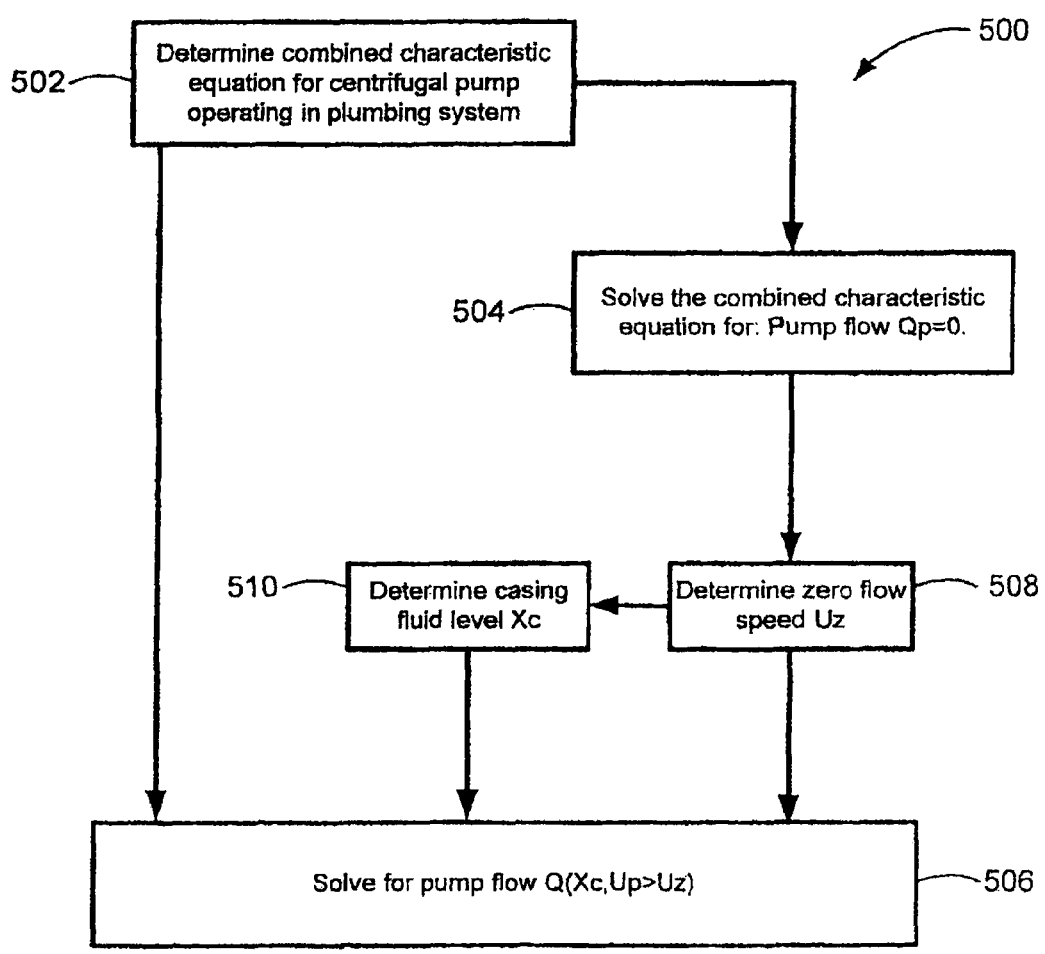
FIG. 20 is a block diagram of an exemplary embodiment of a method, according to the invention, for determining a pump flow without use of input torque of a motor driving a centrifugal pump.

FIG. 20 illustrates an exemplary embodiment of a method 500, according to the invention, for determining a flow rate Qp from a centrifugal pump 32 operating at a selected pump speed Up, while disposed in a wellbore 39 for transferring fluid within the wellbore 39, without using motor torque Tm, as a function of the selected operating speed Up and a fluid level Xc in the wellbore 39.

In the exemplary embodiment of the method 500, the centrifugal pump 32 is connected to an outlet tubing system 38, of the well 30, as illustrated in FIGS. 1 and 14. The exemplary method 500 includes calculating the pump flow Qp by performing the steps, as shown in FIG. 20, of: step 502, determining a combined characteristic equation for the centrifugal pump 32 operating in a plumbing system disposed within and including the wellbore 39, in the form of the oil well 30 shown in FIG. 1, as a function of the fluid level Xc in the wellbore 39; and step 506, solving the combined characteristic equation for the pump flow Qp as a function of a selected pump speed Up.

Figure 21:
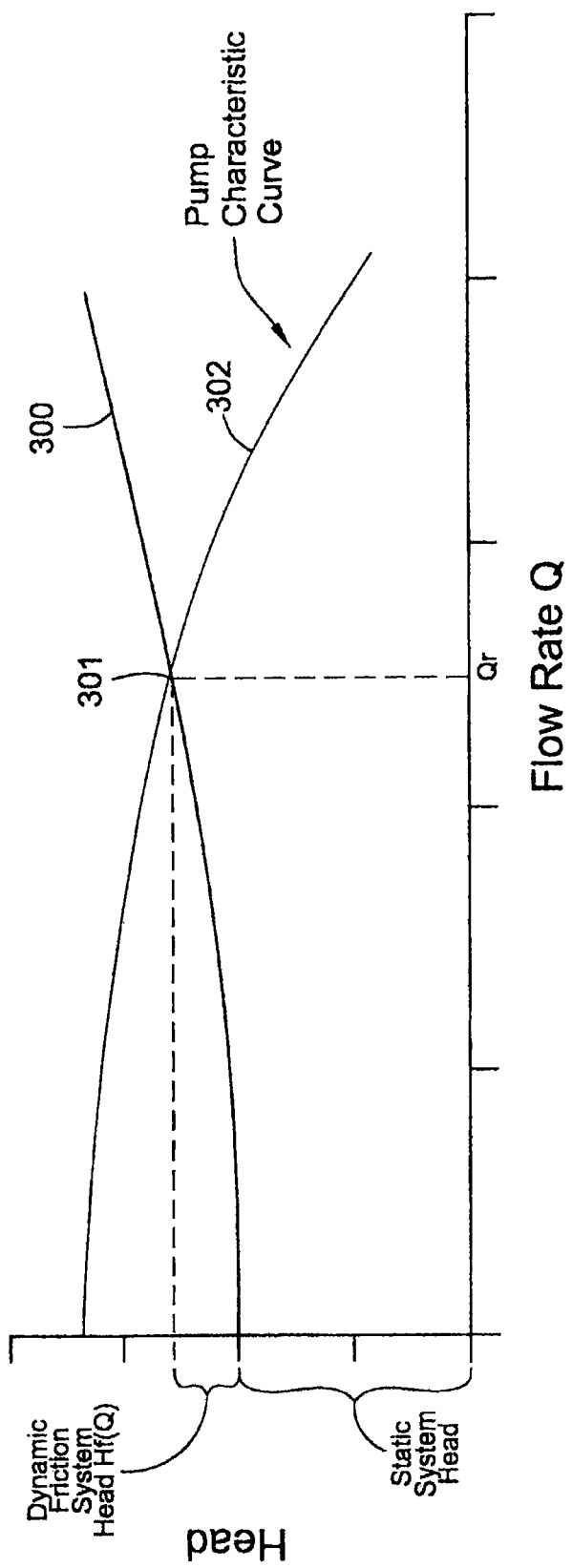
FIG. 21 is a simplified graphical illustration of the pump and system curves of FIG. 17, illustrating components of a combined characteristic curve during operation at a rated speed of the centrifugal pump.

As indicated graphically in FIG. 21, the combined characteristic equation will generally take the form of: (the static head of the system)+(the dynamic friction head loss of the system)=(pump curve). The Step 502 of determining the combined characteristic equation may be accomplished by any appropriate method. In one embodiment of the invention, the combined characteristic equation may be determined by fitting a curve to system head loss equations according to a Moody/Darcy-Weisbach analysis, using pump flows within the operating range of the system. One form of such a curve fitting yields a combined characteristic equation, substantially as follows, for the exemplary embodiment of the oil well 30 illustrated in FIGS. 1 and 14:

$$(Xp * Dt + Pt) - (Xc * Dc + Pc) + Hf(Qp) = Hr\left(Qp * \frac{Ur}{Up}\right)\left(\frac{Up}{Ur}\right)^2$$

It will be noted that although the equation above, in the exemplary embodiment, includes a squared term, in other embodiments of the invention it may be desirable to use powers other than a perfect square over the range of 1.5 to 2.5, or another appropriate power, in practicing the invention.

In alternate embodiments of the invention, it may also be desirable to develop a look-up table of values for determining the pump flow Qp, using appropriate empirical data and/or computational tools, rather than developing and using the combined characteristic equation in the manner described above.

In the particular exemplary embodiment of the method 500, according to the invention, shown in FIG. 20, the method 500 for determining pump flow Qp further includes the step of determining a zero-flow speed Uz, as indicated in Block 508, to provide a lower bound on the solution of the combined characteristic equation, and determining casing fluid level Xc as indicated in Block 510.

The step 510 of determining casing fluid level Xc may be accomplished in any appropriate manner. Preferably, the fluid level Xc is determined in accordance with the teachings of the present invention, as described above, but any other appropriate method may also be utilized, such as direct measurement of the fluid level Xc, or estimation of fluid level Xc by any appropriate means such as through sonic reflection measurements as is known in the art.

In similar fashion, the Step 508 of determining zero-flow speed Uz of the pump may be accomplished by any appropriate method including, but not limited to, direct measurement with a flow meter, or any of the methods described herein with regard to practice of the present invention.

In one embodiment of the method 500, according to the invention, generally applicable for use in a system such as the exemplary embodiment of the oil well 30, the zero flow speed Uz of the pump 32 may be determined, in step 508, as a function of fluid level Xc, by solving the combined characteristic equation with pump flow Qp set to zero, in such a manner that the following equation for determining zero-flow pump speed Uz(Xc), as a function of the fluid level Xc, is provided:

$$Uz(Xc) = Ur\sqrt{\frac{(Xp*Dt+Pt)-(Xc*Dc+Pc)}{Hr(Qp=0)}}$$

Once the fluid level Xc and the zero-flow speed Uz are known, the combined characteristic equation determined in step 502 may be solved for the pump flow Qp at any pump speed Up greater than the zero-flow speed Uz, using methods of ordinary skill in the art.

It will be noted that although the equation above includes a square root, in the exemplary embodiment, in other embodiments of the invention it may be desirable to alternatively use roots over the range of 1.5 to 2.5, for example, or any other appropriate root, in practicing the invention.

As a practical matter, the exemplary embodiment of the method 500, according to the invention, shown in FIG. 20 limits solutions to the combined characteristic equation to those values of pump speed Up greater than the zero-flow speed Uz.

The calculated flow Q may be utilized for controlling the centrifugal pump 32 in any appropriate manner, such as for: optimizing performance of the well optimizing energy efficiency, ensuring that adequate flow through the pump is provided for cooling and lubrication of the pump; and, for detecting problems in the system, such as a worn pump or leaks in the tubing.

Figure 22:
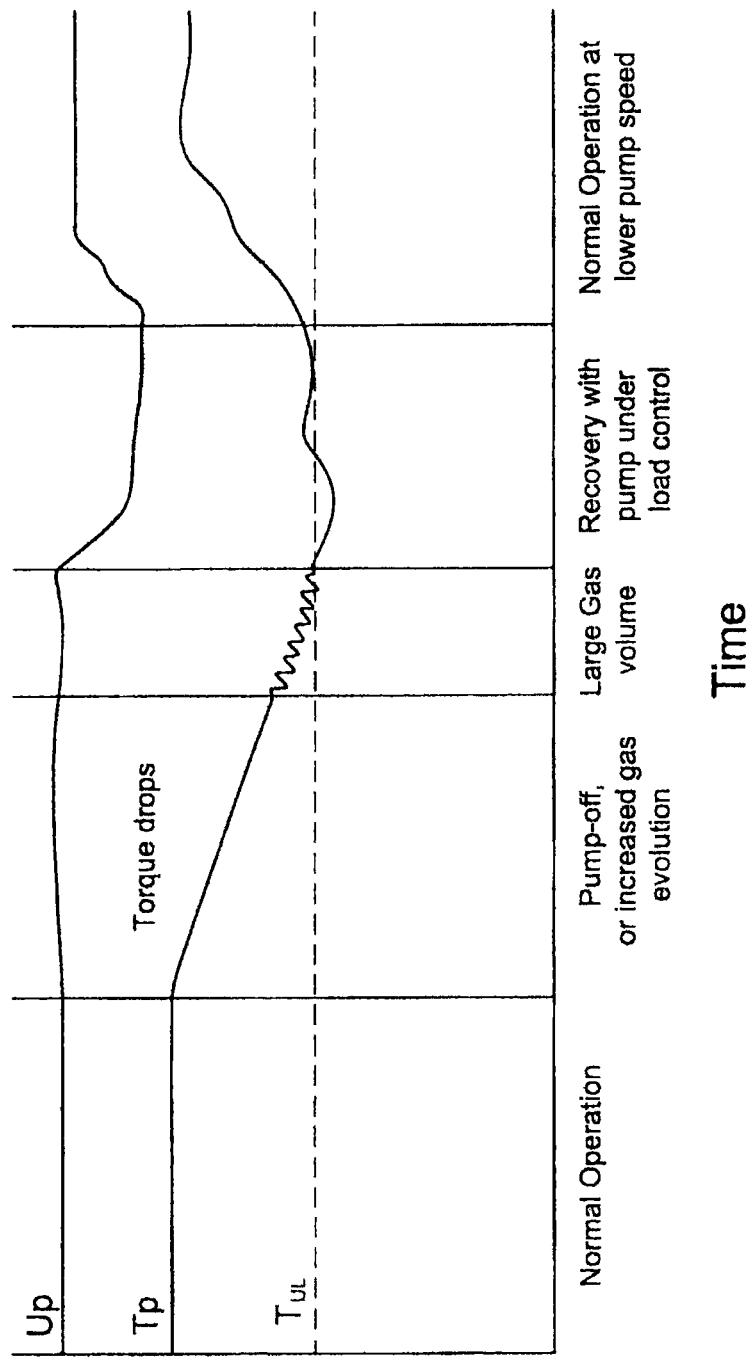
FIG. 22 is a graphical illustration showing operation of an apparatus or method, according to the invention, for determining the onset of a pump-off and/or gas-lock condition in a system according to the invention, and for controlling a pump of the system to allow for continued operation at reduced speed during recovery of the well from the pump-off and/or gas-lock condition.

Detecting the Onset of a Pump-Off and/or Gas-Lock Condition, and Control for Precluding Instigation of Pump-Off and/or Gas-Lock FIG. 22 is a graphical illustration showing operation of an apparatus or method, according to the invention, for determining the onset of a pump-off and/or gas-lock condition in a system according to the invention, and for controlling a pump of the system in a manner allowing continued operation, at reduced speed, during recovery of the well from the pump-off and/or gas-lock condition.

FIG. 23 is a graphical illustration showing operation of an apparatus or method, according to the invention, for automatically determining, on a periodic basis, a maximum pumping speed for continued operation of a system according to the invention in a manner precluding instigation of a pump-off and/or gas-lock condition during continuous operation of the system, and/or during recovery from a pump-off or gas-lock condition.

Vector Controller

Figure 10:
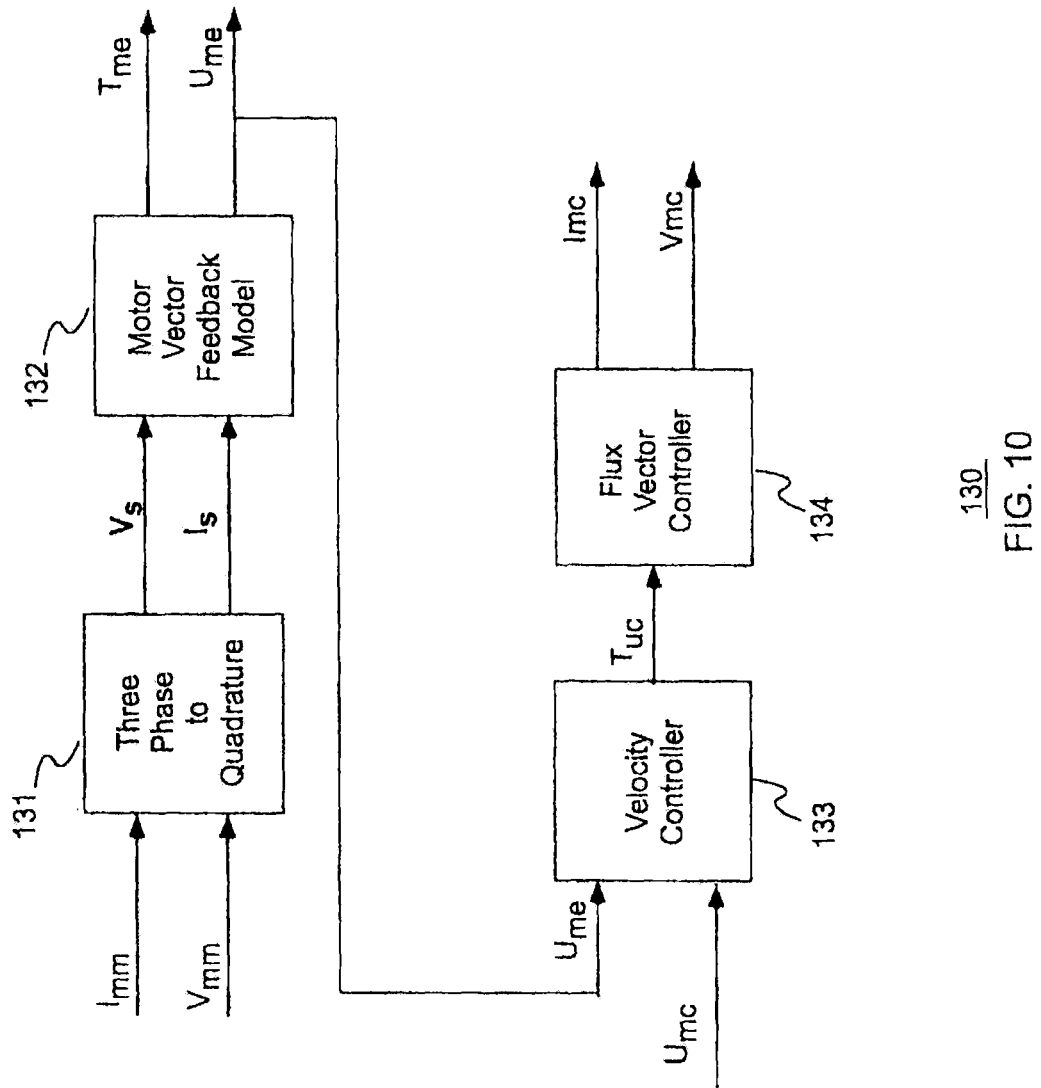
FIG. 10 is a simplified block diagram of an algorithm for a vector controller of the centrifugal pump control system of FIGS. 3 and 4.

Reference is now made to FIG. 10, which is a simplified block diagram of the motor vector controller 130. The motor vector controller 130 contains functions for calculating the velocity error and the torque necessary to correct it, convert torque commands to motor voltage commands and current commands and calculate motor torque and speed estimates from measured values of motor voltages and motor currents.

In one embodiment, the stator flux is calculated from motor voltages and currents and the electromagnetic torque is directly estimated from the stator flux and stator current. More specifically, in Block 131, three-phase motor voltage measurements Vmm and current measurements Imm are converted to dq (direct/quadrature) frame signals using three to two phase conversion for ease of computation in a manner known in the art. Signals in the dq frame can be represented as individual signals or as vectors for convenience. The motor vector feedback model 132 responds to motor stator voltage vector Vs and motor stator current vector Is to calculate a measure of electrical torque Tme produced by the motor. In one embodiment, the operations carried out by motor vector feedback model 132 for calculating the electrical torque estimate are as follows. The stator flux vector Fs is obtained from the motor stator voltage Vs and motor stator current Is vectors according to equation (2):

$$Fs=(Vs-Is\cdot Rs)/s \quad (2)$$

$$Fds=(Vds-Ids\cdot Rs)/s \quad (2A)$$

$$Fqs=(Vqs-+Iqs\cdot Rs)/s \quad (2B)$$

where Rs is the stator resistance and s (in the denominator) is the Laplace operator for differentiation. Equations (2A) and (2B) show typical examples of the relationship between the vector notation for flux Fs, voltage Vs, and current Is and actual d axis and q axis signals.

In one embodiment, the electrical torque Tme is estimated directly from the stator flux vector Fs obtained from equation (2) and the measured stator current vector Is according to equation (3) or its equivalent (3A):

$$Tme=Ku\cdot(3/2)\cdot P\cdot FsxIs \quad (3)$$

$$Tme=Ku\cdot(3/2)\cdot P\cdot(Fds\cdot Iqs-Fqs\cdot Ids) \quad (3A)$$

where P is the number of motor pole pairs and Ku is a unit scale factor to get from MKS units to desired units.

In one embodiment, rotor velocity Ume is obtained from estimates of electrical frequency Ue and slip frequency Us. The motor vector feedback model 132 also performs this calculation using the stator voltage Vs and stator current Is vectors. In one embodiment, the operations carried out by the motor vector feedback model 132 for calculating the motor velocity Ume are as follows. A rotor flux vector Fr is obtained from the measured stator voltage Vs and stator current Is vectors along with motor stator resistance Rs, stator inductance Ls, magnetizing inductance Lm, leakage inductance SigmaLs, and rotor inductance Lr according to equations (4) and (5); separate d axis and q axis rotor flux calculations are shown in equations (5A) and (5B) respectively:

$$SigmaLs=Ls-Lm^2/Lr \quad (4)$$

then, $$Fr=(Lr/Lm)\cdot[Fs-Is\cdot SigmaLs] \quad (5)$$

$$Fdr=(Lr/Lm)\cdot(Fds-SigmaLs\cdot Ids) \quad (5A)$$

$$Fqr=(Lr/Lm)\cdot(Fqs-SigmaLs\cdot Iqs) \quad (5B)$$

The slip frequency Us can be derived from the rotor flux vector Fr, the stator current vector Is, magnetizing inductance Lm, rotor inductance Lr, and rotor resistance Rr according to equation (6):

$$Us=Rr\cdot(Lm/Lr)\cdot[Fdr\cdot Iqs-Fqr\cdot Ids] \quad (6)$$

$$Fdr^2+Fqr^2$$

The instantaneous excitation or electrical frequency Ue can be derived from stator flux according to equation (7):

$$Ue=Fds\cdot sFqs-Fqs\cdot sFds \quad (7)$$

$$Fds^2+Fqs^2$$

The rotor velocity or motor velocity Ume can be derived from the number of motor pole pairs P the slip frequency Us and the electrical frequency Ue according to equation (8):

$$Ume=(Ue-Us)(60)/P \quad (8)$$

In cases where long cable lengths or step up transformers are used, the impedances of the additional components can be added to the model of motor impedances in a method that is known.

Figure 15:
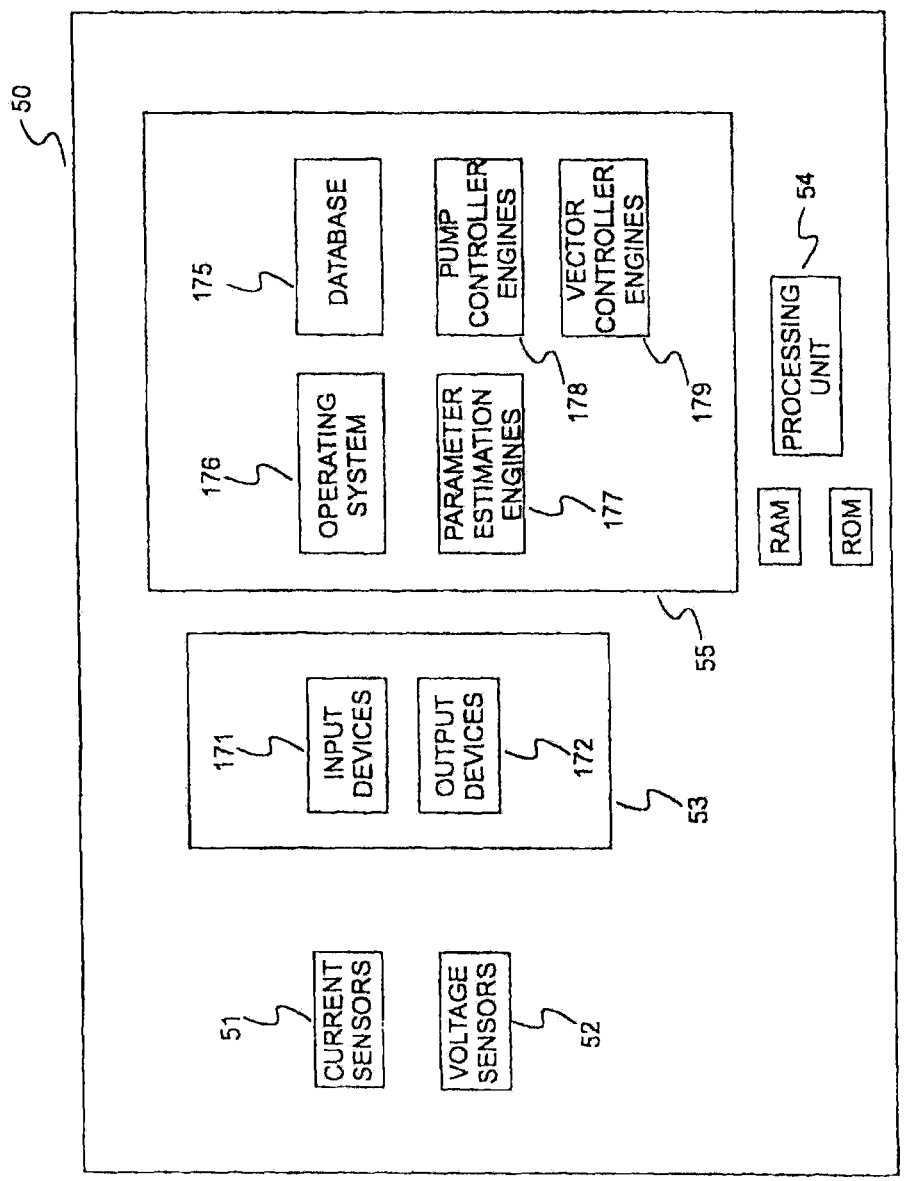
FIG. 15 is a block diagram of the controller of the pump control system of FIGS. 3 and 4.

The velocity controller 133 uses a PI controller (proportional, integral), PID controller (proportional, integral, derivative) or the like to compare the motor speed Ume with the motor speed command Umc and produce a speed error torque command Tuc calculated to eliminate the speed error. The speed error torque command Tuc is then converted to motor current commands Imc and voltage commands Vmc in flux vector controller 134 using a method which is known. Referring to FIG. 15, in one preferred embodiment, the pump control system provided by the present invention is software based and is capable of being executed in a controller 50 shown in block diagram form in FIG. 13. In one embodiment, the controller 50 includes current sensors 51, voltage sensors 52, input devices 171, such as analog to digital converters, output devices 172, and a processing unit 54 having associated random access memory (RAM) and read-only memory (ROM). In one embodiment, the storage devices 55 include a database 175 and software programs and files which are used in carrying out simulations of circuits and/or systems in accordance with the invention. The programs and files of the controller 50 include an operating system 176, the parameter estimation engines 177 that includes the algorithms for the pump model 60 (FIG. 5) or pump model 260 (FIG. 6) and the pump system model 80 (FIG. 7), pump controller engines 178 that include the algorithms for fluid level feedforward controller 90 (FIG. 8) and the fluid level feedback controller 100 (FIG. 9), and vector controller engines 179 for the motor vector controller 130 for converting motor current and voltage measurements to torque and speed estimates and converting speed and torque feedforward commands to motor current and voltage commands, for example. The programs and files of the computer system can also include or provide storage for data. The processing unit 54 is connected through suitable input/output interfaces and internal peripheral interfaces (not shown) to the input devices, the output devices, the storage devices, etc., as is known Optimized Gas Production The production of methane gas from coal seams can be optimized using the estimated parameters obtained by the pump controller 50 (FIG. 3 or FIG. 4) in accordance with the invention. For methane gas production, it is desirable to maintain the casing fluid level at an optimum level. A range for casing fluid level command Xcc is selected to define an optimal casing fluid level for extracting methane gas. This range is commonly referred to as a sweet zone.

In one embodiment of the present invention, the selection of the sweet zone is determined by the controller 50 (FIG. 3 or FIG. 4) that searches to find the optimum casing fluid level command Xcc. Since the sweet zone can change as conditions in the well change over time, it can be advantageous to program the controller 50 to perform these searches at periodic intervals or when specific conditions, such as a decrease in efficiency, are detected. In determining the sweet zone, the centrifugal pump intake pressure Ps or casing fluid level Xc is controlled. The centrifugal pump 32 is controlled by the fluid level feedforward controller 90 and the fluid level feedback controller 100 to cause the casing fluid level Xc to be adjusted until maximum gas production is obtained. The casing fluid level command Xcc is set to a predetermined start value. The methane gas flow through outlet 42 at the surface is measured. The casing fluid level command is then repeatedly incremented to progressively lower values. The methane gas production is measured at each new level to determine the value of casing fluid level Xc at which maximum gas production is obtained. The point of optimum performance is called the sweet spot. The sweet zone is the range of casing fluid level above and below the sweet spot within which the gas production decrease is acceptable. However, the selection of the sweet zone can be done manually by taking readings.

Improved Pump Energy Efficiency and Operating Range

Figure 16:
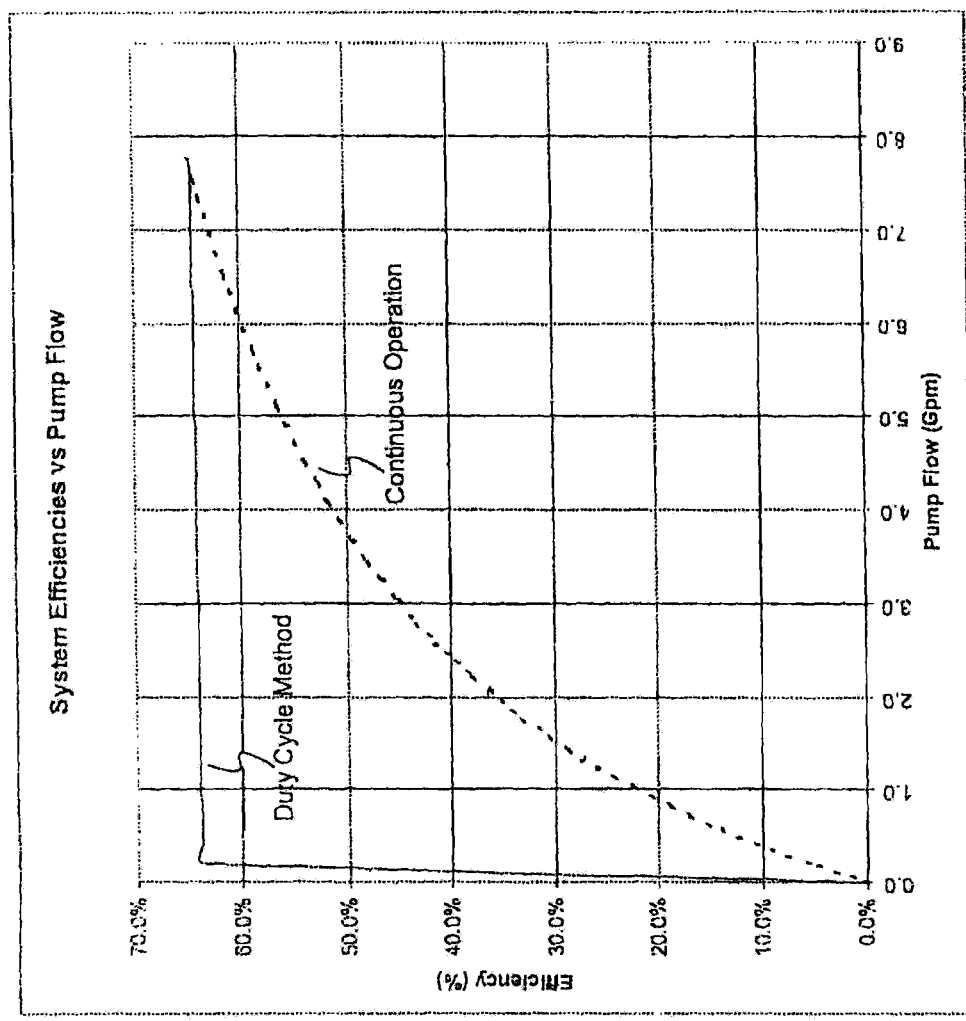
FIG. 16 is a set of two curves comparing the efficiency of a pumping system using duty cycle control to the efficiency of a pumping system using continuous rotary speed.

One method to optimize the pump control when operated at low flow and/or efficiency, is to operate using a duty cycle mode to produce the required average flow rate while still operating the centrifugal pump at its most efficient and optimal flow rate point Qo. In this duty cycle mode, the volume of fluid to be removed from the casing can be determined using the fluid inflow rate Qi when the casing fluid level Xc is near the desired level. A fluid level tolerance band is defined around the desired fluid level, within which the fluid level is allowed to vary. The volume Vb of the fluid level tolerance band is calculated from the projected area between the tubing, casing and pump body and the prescribed length of the tolerance band. This volume is used with the fluid inflow rate Qi to determine the pump off time period Toff. When the centrifugal pump is on, the value for casing fluid level Xc is calculated and the fluid level in the casing is reduced to the lower level of the fluid level tolerance band, when the pump is again turned off The fluid inflow rate Qi is calculated by dividing the fluid level tolerance band volume Vb by the on time period Ton used to empty the band, then subtracting the result from the optimal pump flow rate Qo used to empty the band. The on-off duty cycle varies automatically to adjust for changing well inflow characteristics. This variable duty cycle continues with the centrifugal pump operating at its maximum efficiency over a range of average pump flow rates varying from almost zero to the flow associated with full time operation at the most efficient speed. Use of the duty cycle mode also increases the range of controllable pump average flow by using the ratio of on time, Ton, multiplied by optimal flow rate, Qo, divided by total cycle time (Ton+Toff) rather than the centrifugal pump speed to adjust average flow. This also avoids the problem of erratic flow associated with operating the pump at very low speeds. This duty cycle method can produce significant energy savings at reduced average flow rates as shown in FIG. 16. As can be seen in FIG. 16, the efficiency of the example pump using continuous operation decreases rapidly below about 7.5 gallons per minute (GPM), while the efficiency of the same pump operated using the duty cycle method remains at near optimum efficiency over the full range of average flow.

Pump system efficiency is determined by the ratio of the fluid power output to the mechanical or electrical power input. When operated to maximize efficiency, the controller turns the centrifugal pump off when the centrifugal pump starts operating in an inefficient range. In addition, the centrifugal pump is turned off if a pump off condition casing level at the pump intake is detected by a loss of measured flow.

For systems with widely varying flow demands, multiple centrifugal pumps, each driven by a separate motor, may be connected in parallel and staged (added or shed) to supply the required capacity and to maximize overall efficiency. The decision for staging multiple centrifugal pumps is generally based on the maximum operating efficiency or capacity of the centrifugal pump or combination of centrifugal pumps. As such, when a system of centrifugal pumps is operating beyond its maximum efficiency point or capacity and another centrifugal pump is available, a centrifugal pump is added when the efficiency of the new combination of centrifugal pumps exceeds the current operating efficiency. Conversely, when multiple centrifugal pumps are operating in parallel and the flow is below the combined maximum efficiency point, a centrifugal pump is shed when the resulting combination of centrifugal pumps have a better efficiency. These cross-over points can be calculated directly from the efficiency data for each centrifugal pump in the system, whether the additional centrifugal pumps are variable speed or fixed speed.

Pump and Pump System Protection

One method of protecting the centrifugal pump and system components is to use sensors to measure the performance of the system above ground and compare this measurement to a calculated performance value. If the two values differ by a threshold amount, a fault sequence is initiated which may include such steps as activating an audio or visual alarm for the operator, activating an alarm signal to a separate supervisory controller or turning off the centrifugal pump. In one embodiment, a sensor is used to measure the flow in the tubing at the surface Qpm and compare it with the calculated value Qpe. If the actual flow Qpm is too low relative to the calculated flow Qpe, this could be an indication of a fault such as a tubing leak, where not all of the flow through the centrifugal pump is getting to the measurement point.

Another method of protecting the pump is to prevent excessive mechanical power input. In one embodiment, the mechanical power input to the pump is calculated by multiplying the speed Ume by the torque Tme. The result is compared to the mechanical input power limit Ple calculated by the pump model (FIG. 5 or FIG. 6). If the limit Ple is exceeded, the torque and speed are reduced to protect the pump.

Although exemplary embodiments of the present invention have been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, or alterations should therefore be seen as being within the scope of the present invention.

All such changes, modifications, and alterations should therefore be seen as being within the scope of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of determining a fluid level Xc in a wellbore, where the wellbore extends downward from a surface and has a centrifugal pump disposed therein for transferring fluid within the wellbore using a controller operatively connected to the centrifugal pump, the method comprising:

determining the value of the zero-flow input speed Uz using the controller to the centrifugal pump at which the output flow from the centrifugal pump is substantially zero, without using output flow from the centrifugal pump;

determining the zero-flow input speed Uz, by monitoring input torque T to the centrifugal pump as input speed Up is reduced, and detecting the zero-flow input speed Uz as an input speed Up at which an incremental reduction in input speed Up is not accompanied by a corresponding incremental reduction in input torque T, and using the zero-flow input speed Uz to calculate, with the controller, the fluid level Xc in the wellbore; and monitoring a change in torque dT and a change in input speed dU and calculating a quotient dT/dU of the change in torque dT divided by the change in input speed dU, as the input speed Up is reduced, and determining Uz to be substantially a speed at which dT/dU achieves a maximum, using the controller.

2. The method of, claim 1, further comprising, determining a minimum desired input speed Umin of the pump which is greater than the zero-flow input speed Uz, and controlling the pump to operate only at speeds where Up≧Umin, using the controller.

3. The method of claim 1, further comprising, monitoring dT/dU, as the input speed Up is reduced, and determining Uz to be a speed at which dT/dU falls below a selected minimum value that is less than the maximum, using the controller.

4. The method of claim 1, wherein the selected minimum value of dT/dU is substantially but not equal to zero.

5. The method of claim 1, further comprising, using an affinity law for calculating a zero-flow pump differential pressure Hpz at the zero-flow input speed Uz, and using the zero-flow pump differential pressure Hpz for calculating the fluid level Xc in the wellbore, using the controller.

* * * * *